United States Patent
Kwok et al.

(10) Patent No.: US 8,033,497 B2
(45) Date of Patent: Oct. 11, 2011

(54) HYBRID THERMAL AIRSHIP

(75) Inventors: David W. Kwok, La Mirada, CA (US); Blaine Knight Rawdon, San Pedro, CA (US); John Anthony Skorupa, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 676 days.

(21) Appl. No.: 12/131,655

(22) Filed: Jun. 2, 2008

(65) Prior Publication Data

US 2009/0314879 A1 Dec. 24, 2009

(51) Int. Cl.
*B64B 1/62* (2006.01)
(52) U.S. Cl. .............................................. 244/5; 244/97
(58) Field of Classification Search ................ 244/5, 26, 244/97
See application file for complete search history.

(56) References Cited

U.S. PATENT DOCUMENTS

| 1,424,491 | A | * | 8/1922 | Langevin | 244/5 |
|---|---|---|---|---|---|
| 1,549,570 | A | * | 8/1925 | Boothby | 244/97 |
| 2,180,036 | A | * | 11/1939 | Dardel | 244/97 |
| 2,428,656 | A | * | 10/1947 | Elliott et al. | 244/97 |
| 3,096,047 | A | * | 7/1963 | Dunn, Jr. | 244/26 |
| 5,005,783 | A | * | 4/1991 | Taylor | 244/97 |
| 5,333,817 | A | * | 8/1994 | Kalisz et al. | 244/97 |
| 7,093,789 | B2 | | 8/2006 | Barocela et al. | |
| 7,137,592 | B2 | | 11/2006 | Barocela et al. | |
| 2009/0314880 | A1 | | 12/2009 | Rawdon et al. | |

* cited by examiner

*Primary Examiner* — Galen Barefoot
(74) *Attorney, Agent, or Firm* — Yee & Associates, P.C.

(57) ABSTRACT

An airship comprises a shell, a gas storage system, an air storage system, a cargo storage system, a heating system, and a propulsion system. The shell encompasses a volume. The gas storage system is located within the volume, wherein the gas storage system is capable of storing a lighter than air gas. The air storage system is located within the volume, wherein the air storage system is capable of storing heated air. The heating system is capable of heating air. The propulsion system is capable of propelling the shell during flight.

23 Claims, 13 Drawing Sheets

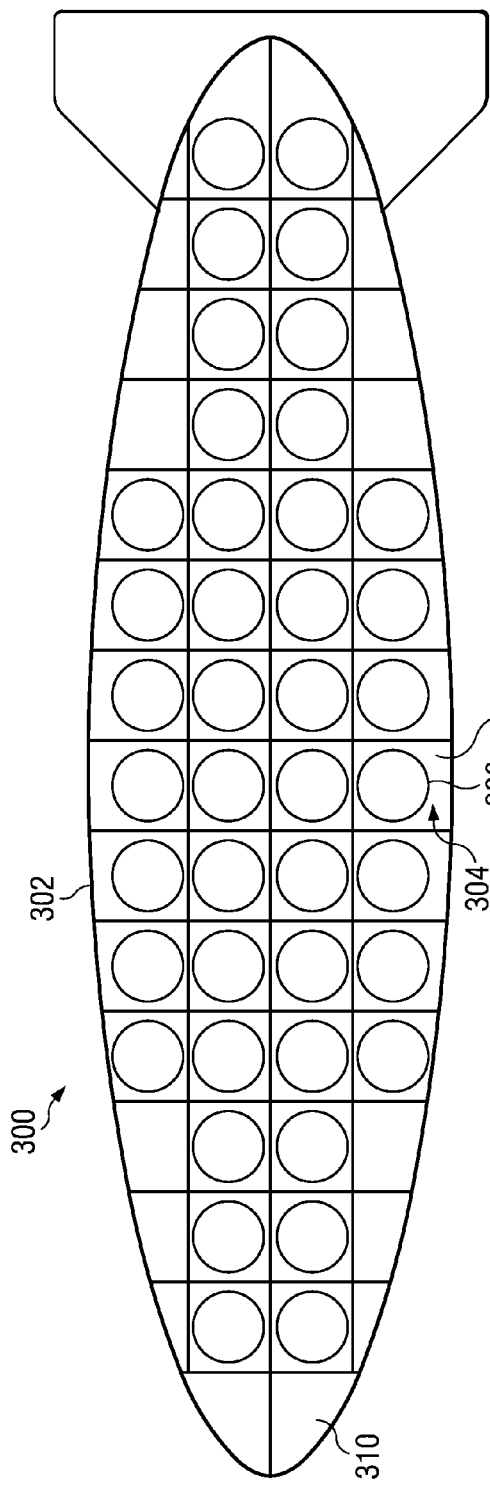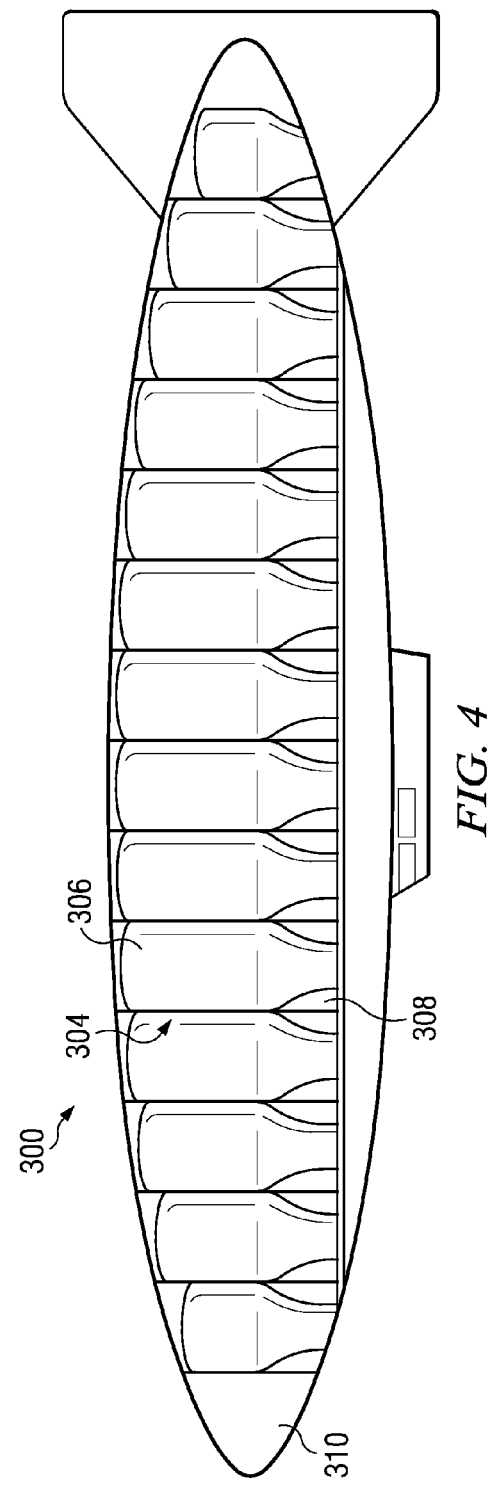

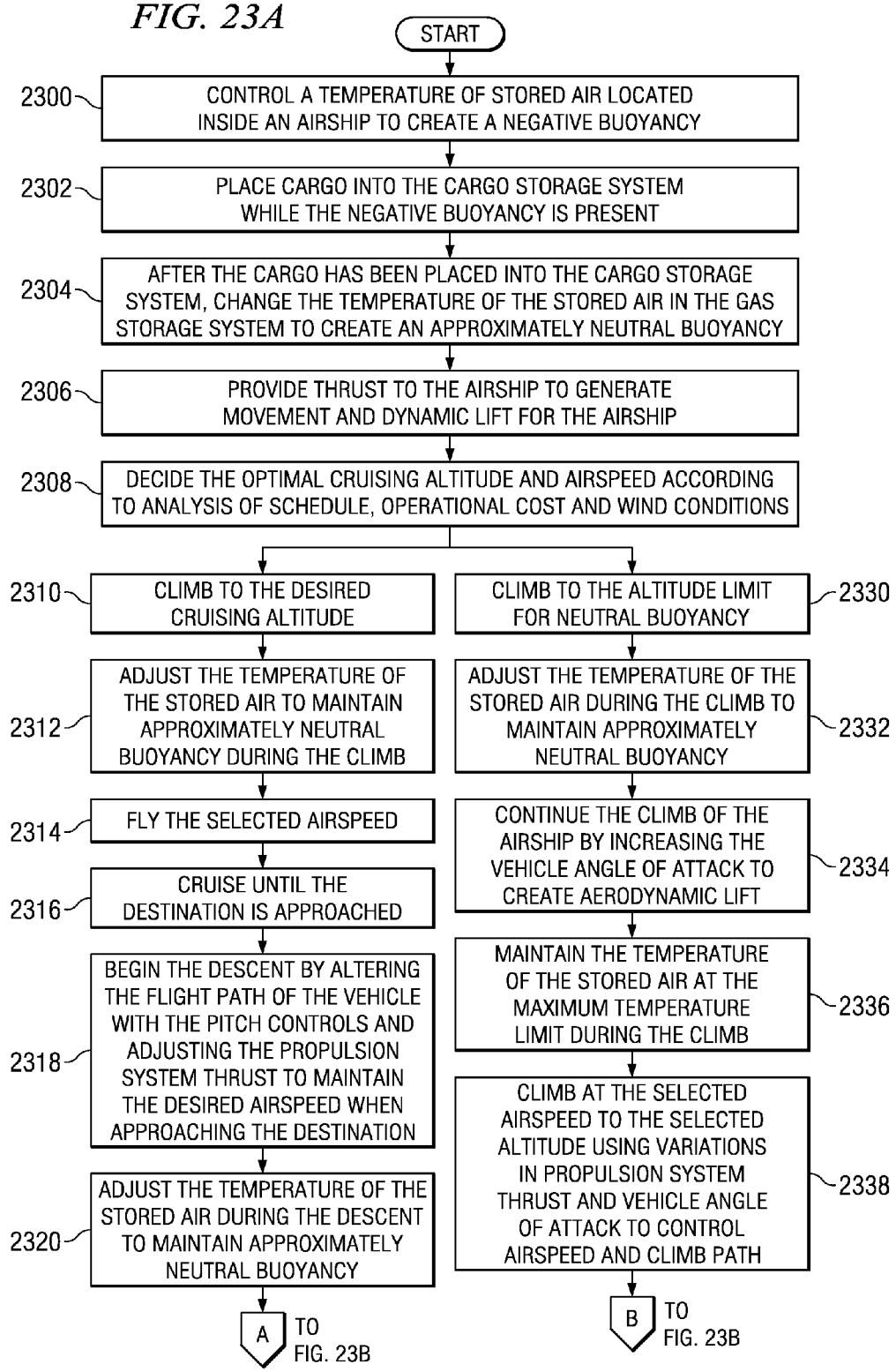

HYBRID THERMAL AIRSHIP

The present application is related to the following application: Ser. No. 12/131,671, filed on Jun. 2, 2008, published as 2009-0314880 on Dec. 24, 2009, and titled "Bi-Convex Airship", assigned to the same assignee, and incorporated herein by reference.

BACKGROUND INFORMATION

1. Field

The present disclosure relates generally to air vehicles and in particular to vehicles that are lighter than air. Still more particularly, the present disclosure relates to a method and apparatus for a lighter than air vehicle capable of carrying cargo.

2. Background

A lighter than air vehicle or aircraft is also referred to as just an airship. Typically, an airship may be steered or propelled through the air using rudders, elevators, and a propulsion system, such as a propeller. Unlike other aerodynamic aircraft, such as airplanes and helicopters, an airship may stay aloft by filling a volume encompassed by a shell with a gas that is lighter than the surrounding air.

Airships may be non-rigid, semi-rigid, or rigid. Non-rigid airships use a pressure level in excess of the surrounding air pressure to maintain a shape. Semi-rigid airships require internal pressure to maintain shapes but usually have frames to distribute suspension loads. Rigid airships may have rigid frames containing multiple non-pressurized gases to provide lift. Rigid airships do not depend on internal pressure to maintain their shape and may be made to virtually any size or shape.

A number of different factors are present in providing lift for an airship. For example, factors include buoyancy, aerodynamic lift, drag, stability and control, and ice and moisture buildup.

Airships may have two forms of drag. The first is often called "parasite drag". This form of drag results from friction of the air on the surface of the vehicle. The drag is approximately proportional to the surface area of the vehicle times the speed squared. The second form is usually called "induced drag". This drag arises from the dynamic creation of lift by forcing air downwards, generally by the body in the case of an airship. This drag varies as the square of the lift produced and diminishes as speed increases.

Airships generally derive almost all of their lift from buoyancy and have little aerodynamic lift. As a result, airships have almost no induced drag, and almost all drag is parasite drag. Buoyancy is created by enclosing a volume with less density than that of the surrounding air. This volume is generally filled, at least in part, with a lower density gas. Total buoyancy is equal to the mass of the displaced air minus the mass of the gas within the airship volume. For a given required buoyancy and average gas density, an airship encloses a certain volume.

Because the density of air is relatively low, airships are generally very large compared to airplanes for the same gross weight. Airship gross weight may be defined as the sum of the operating empty weight, payload and fuel. The mass of the enclosed gases is not included. The volume of gas is generally enclosed in an envelope or shell that is shaped to provide a balance between low surface area, such as a sphere, and a very streamlined shape, such as a slender "teardrop". This balance may result in the relatively chubby shape of a typical airship.

Airships typically have very large surface areas and no induced drag. As a result, airships can fly with almost no drag at very low speeds. Parasite drag, however, increases rapidly with speed. As a result, efficient airships are generally limited to much lower speeds than airplanes. The optimum speed in still air is generally chosen as a balance between fuel efficiency, best at low speed, and productivity, best at high speed. This balance may depend on the cost of fuel and the cost or value of the flight on a money per time basis.

In general, the efficiency of airships is dependent on the buoyancy closely balancing the gross weight. The ability of most airships to create aerodynamic lift is limited by the low flight speed and by the lack of wings. Also, induced drag may increase rapidly with aerodynamic lift.

An airship may provide aerodynamic lift. This lift can be directed to maneuver the airship around a turn or into a climb or descent, for instance. Lift can also be used to balance the difference between airship gross weight and its buoyancy. Airships are infrequently maneuvered, so induced drag losses during maneuvers does not strongly affect overall efficiency. On the other hand, flying with an ongoing mismatch between buoyancy and gross weight may provide a constant induced drag force that can detract from the vehicle's efficiency. As a result, the need for airship buoyancy to closely match airship gross weight can be diminished if the airship can create aerodynamic lift with an acceptable measure of efficiency.

It is also a general goal to reduce the drag force of airships so that less fuel is burned. Alternatively, it is desirable to reduce drag so that the airship may fly faster with the same fuel consumption.

The size of an airship influences relative drag. This drag may result from the square cube law. The gross weight of an airship is proportional to the displacement (volume) of the body (envelope). This volume is proportional in turn to the cube of the body's length. Drag force is approximately proportional to the surface area of the body which is in turn proportional to the length of the body squared. Thus, the drag per unit gross weight at a given speed drops approximately according to 1/length.

Airship weight and drag may be tightly related. Weight determines the body volume needed to provide buoyancy. The size of the body, in turn, contributes significantly to the weight of the airship.

In general, weight may also be reduced by increasing the efficiency of all airship systems. For instance, a more efficient propulsion system may consume less fuel. This efficiency reduces gross weight. As a result, the body size of the airship may be reduced. In turn, drag and fuel burn may be reduced until the size converges.

With respect to stability and control, a number of parameters may affect the stability and control of airships. For example, when an airship is traveling a straight and level flight at a constant altitude, several conditions are needed. This type of flight is also referred to as a cruise mode. With this type of mode, the lift equals the weight where the lift is the sum of the buoyancy and aerodynamic lift and the weight is the gross weight.

The thrust equals the drag and all moments are required to be zero. The sum of the moments about each axis must equal to zero to provide this type of flight. Further, with a laterally symmetric airship, the roll and yaw moments are typically zero.

A laterally offset payload or fuel load may result in some rolling moments. In a similar fashion, a longitudinally offset payload results in a pitching moment. A lateral offset may result in listing of the airship to one side. These are just some non-limiting examples of the type of parameters that are needed to provide stability.

Further, it is also desirable to be able to change the flight direction orientation of the airship during flight. Further, it is desirable for some airships to be able to maneuver at low speeds or at zero speed. To fly at zero speed, the airship may be neutrally buoyant. Alternatively, the airship may be close to neutrally buoyant with the difference between buoyancy and weight being made up by a vertically-oriented propulsion system. At zero speed, aerodynamic lift on the airship shell is zero, so it cannot make a contribution to lift.

Another factor affecting airships is the build up of ice and moisture. Some airships may build up ice depending on weather conditions. Additionally, certain materials used in an airship may absorb water. These types of conditions may influence the weight of the airship.

Therefore, it would be advantageous to have a method and apparatus that overcomes one or more of the problems described above.

SUMMARY

In one advantageous embodiment, an airship comprises a shell, a gas storage system, an air storage system, a cargo storage system, a heating system, and a propulsion system. The shell encompasses a volume. The gas storage system is located within the volume, wherein the gas storage system is capable of storing a lighter than air gas. The air storage system is located within the volume, wherein the air storage system is capable of storing heated air. The heating system is capable of heating air. The propulsion system is capable of propelling the shell during flight.

In another advantageous embodiment, an apparatus comprises a shell, a gas storage system, an air storage system, a set of aerodynamic lift features, and a propulsion system. The shell encompasses a volume. The gas storage system is located within the volume, wherein the gas storage system is capable of storing a lighter than air gas. The air storage system is located within the volume, wherein the air storage system is capable of storing heated air. The propulsion system is capable of propelling the shell during flight.

In still another advantageous embodiment, a method is present for transporting cargo. A temperature of stored air located inside an airship is controlled to create a variable buoyancy. The airship comprises a shell encompassing a volume; a gas storage system located within the volume, wherein the gas storage system is capable of storing a lighter than air gas; an air storage system located within the volume, wherein the air storage system is capable of storing heated air; a cargo storage system; a heating system for heating air to form the heated air; and a propulsion system capable of propelling the shell during flight. The cargo is placed into the cargo storage system while a negative buoyancy is present. After the cargo has been placed into the cargo storage system, the temperature of the stored air in the gas storage system is changed to create a variable buoyancy. Thrust is provided to the airship to generate movement and dynamic lift for the airship.

In still another advantageous embodiment, a method for controlling an airship is provided. A temperature of stored air located inside an airship is controlled to create a variable buoyancy. The airship comprises a shell encompassing a volume; a gas storage system located within the volume, wherein the gas storage system is capable of storing a lighter than air gas; an air storage system located within the volume, wherein the air storage system is capable of storing heated air; a cargo storage system; and a heating system for heating air to form the heated air.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 3 is a diagram illustrating a top cross-sectional view of an airship in accordance with an advantageous embodiment;

FIG. 4 is a cross-sectional side view of an airship in accordance with an advantageous embodiment;

FIGS. 23A and 23B are a flowchart of a process for moving cargo using an airship in accordance with an advantageous embodiment.

DETAILED DESCRIPTION

Figure 1:
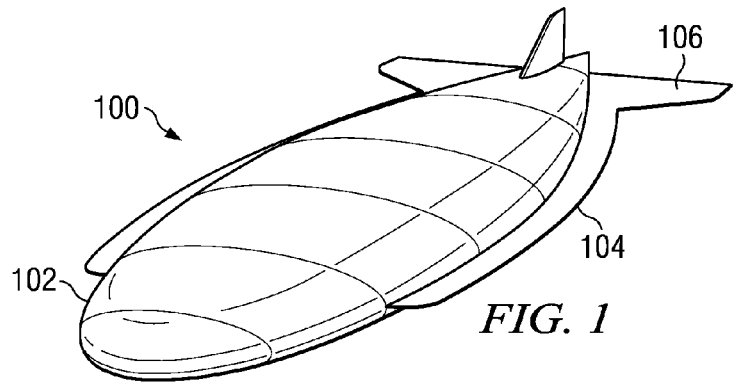
FIG. 1 is a diagram of an airship in which an advantageous embodiment may be implemented.

With reference now to the figures and in particular with reference to FIG. 1, a diagram of an airship is depicted in accordance with an advantageous embodiment. In this example, airship 100 is an example of an airship in which different advantageous embodiments may be implemented. Airship 100 includes shell 102, which may encompass a volume containing various components for airship 100. These components may include, for example, propulsion systems, air conditioners, cargo bays, and other suitable airship components. Further, these components also may be attached to the exterior of shell 102 in other advantageous embodiments.

Airship 100 may be a hybrid thermal airship in some advantageous embodiments. In other advantageous embodiments, airship 100 may be a bi-convex airship. In yet other advantageous embodiments, airship 100 may be both a hybrid thermal and a bi-convex airship. When airship 100 takes the form of a hybrid thermal airship, both air and lighter than air gasses may be used to provide buoyancy for airship 100.

Further, airship 100 may have a bi-convex shape. Also, airship 100 also may include other features in other advantageous embodiments. As illustrated, airship 100 has a shape that provides for aerodynamic lift. In this example, airship 100 also includes features, such as strake 104 and tail 106. In other examples, other features such as a wing also may be present. These features are non limiting examples of different aerodynamic features that may provide lift and stability to airship 100 during flight.

Figure 2:
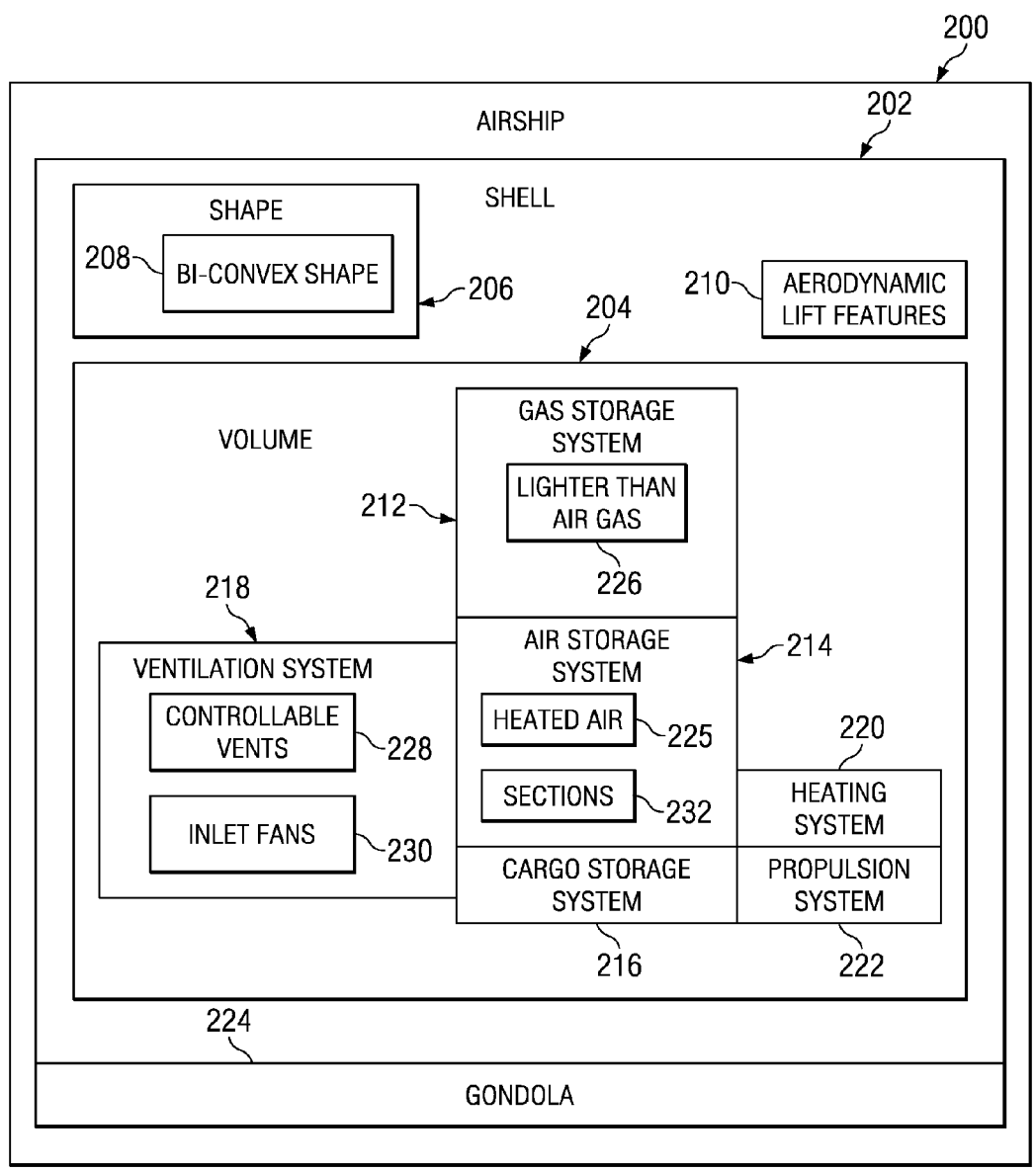
FIG. 2 is a block diagram of an airship in accordance with an advantageous embodiment.

With reference now to FIG. 2, a block diagram of an airship is depicted in accordance with an advantageous embodiment. In this example, airship 200 illustrates components that may be found in an airship, such as airship 100 in FIG. 1. As illustrated, airship 200 includes shell 202, which encompasses volume 204. Shell 202 has shape 206. In particular, in the different advantageous embodiments, this shape may be bi-convex shape 208.

Further, shell 206 may be a rigid shell. As a rigid airship, shell 202 may include a full skeleton over which a material is placed. Alternatively, shell 202 may combine the functions of structure and enclosure as a structural shell material. This structure may be, for example, be a monocoque, semi-monocoque, or sandwich structure.

Shell 202 also may include aerodynamic lift features 210. These lift features may be integrated as part of shell 202 or may be attached to shell 202, with examples of lift features including, for example, without limitation, a tail, a wing, a horizontal control surface, a strake, or some other suitable aerodynamic lift feature.

In these examples, gas storage system 212, air storage system 214, cargo storage system 216, ventilation system 218, heating system 220, and propulsion system 222 may be found within volume 204. Gondola 224 may be attached to the exterior of shell 202.

Gas storage system 212 may be used to store lighter than air gas 226. Lighter than air gas 226 may be, for example, helium, hydrogen, and/or any other suitable gas. Gas storage system 212, in these examples, stores an amount of lighter than air gas 226 that may provide for buoyancy of airship 200.

Buoyancy is the upward force on an object that may be produced through gasses encompassed in volume 204.

Buoyancy may be positive, neutral, or negative. Positive buoyancy is when sufficient upward force is present to lift airship 200 upwards. Negative buoyancy results, with lifting force from gas storage system 212 and air storage system 214 causes airship 200 to sink towards the ground. Neutral buoyancy is a buoyancy level at which airship 200 does not rise or fall. Through the combination of gas storage system 212 and air storage system 214, airship 200 may provide variable buoyancy, which may be one of positive, neutral, and negative.

Lighter than air gas 226 provides one mechanism for buoyancy or lift. This neutral buoyancy may be present, in these examples, when airship 200 is at its minimum weight. In some advantageous embodiments, a slightly negative buoyancy may be present when airship 200 is at its minimum weight. This negative buoyancy may prevent airship 200 from being moved around by wind or other forces while airship 200 is on the ground. The minimum weight of airship 200 is the weight when no payload or fuel is present.

In these examples, air storage system 214 provides a second mechanism for providing buoyancy and/or lift to airship 200. When airship 200 is at a neutral buoyancy or slightly negative buoyancy, air storage system 214 may provide a system to change the buoyancy of airship 200 to a negative or positive buoyancy.

Air storage system 214, in these examples, may store air at different temperatures. Heating system 220 may heat air to form heated air 225 within air storage system 214. This heated air may be used to provide additional buoyancy to airship 200. In these examples, heated air 225 in air storage system 214 is able to "breathe" in and out as the altitude varies. Unlike lighter than air gas 226 in gas storage system 212, heated air 225 is not sealed within air storage system 214.

Heating system 220 may be implemented in a number of different ways. For example, heating system 220 may be selected from at least one of propulsion system 222, a heater unit, a heat exchange system connected to a set of heat generating components, or some other suitable heating system. As used herein, the phrase "at least one of" when used with a list of items means that different combinations one or more of the items may be used and only one of each item in the list is needed. For example, "at least one of item A, item B, and item C" may include, for example, without limitation, item A, or item A and item B. This example also may include item A, item B, and item C, or item B and item C.

Heating system 220 may be implemented using an exhaust directly from propulsion system 222 to heat air to form heated air 225. In other advantageous embodiments, heating system 220 may take the form of a heat exchanger. A heat exchanger may be used to transfer heat from various components in airship 200. The heat exchanger may obtain heat from heat services, such as propulsion system 222, a cooling system for elements, such as an air conditioner, avionics, actuators, and other suitable components.

Additionally, heating system 220 may be a system that collects solar heat in other advantageous embodiments. In yet other advantageous embodiments, a dedicated heater, such as those currently used in hot air balloons, also may be used.

When heat is obtained from exhaust emitted by propulsion system 222, the exhaust may be routed into air storage system 214 through a Y connection in the valve. As a result, a variation in engine exhaust flow rates may be used to change the temperature of heated air 225. Also, by varying the setting of the Y valve connection, the proportion of exhaust flowing into air storage system 214 versus the amounts of exhaust exiting may be controlled.

With air storage system 214, heated air 225 may lose heat through normal losses. Ventilation system 218 may be used to reduce the temperature of heated air 225 to decrease the buoyancy of airship 200 in these examples. Ventilation system 218 provides a quicker mechanism for reducing buoyancy. Ventilation system 218 may increase the maneuverability of airship 200. Ventilation system 218 may include controllable vents 228 and inlet fans 230. Controllable vents 228 may be located in a position to remove the hotter air from air storage system 214 first.

Inlet fans 230 may be used to aid in expelling heated air from air storage system 214 through controllable vents 228. Further, inlet fans 230 also may draw in cool ambient air into air storage system 214 to increase the speed in which heated air 225 is cooled. Inlet fans 230 may be located within controllable vents 228. In other advantageous embodiments, inlet fans 230 may be located at other openings other than through controllable vents 228.

Further, air storage system 214 may be heated and cooled in sections 232. In other words, different zones, portions, or sections within sections 232 may be heated and cooled differently to change the moment of airship 200. For example, a set of sections in the front part of airship 200 may be heated more or less than a set of sections in the back part of airship 200 to change the pitch of airship 200. The roll moment of airship 200 may be changed by heating sections on one side of airship 200 differently from the other side of airship 200. Further, additional fine tuning of the change in the position of the moment of airship 200 may be made by heating and cooling even smaller portions of sections 232 differently from other sections with the air storage system 214.

Gondola 224 is a component similar to a fuselage that may be attached to shell 202. This gondola may be attached to shell 202 or partially integrated in shell 202. In these examples, gondola 224 may include components, such as a flight deck and a passenger area. In addition, gondola 224 may be located at the forward bottom section of shell 202.

Propulsion system 222 may take various forms. For example, propulsion system 222 may be, for example, a propeller engine, a jet engine, or some other type of suitable propulsion system.

The buoyancy of airship 200 is controlled by the temperature of the heated air in air storage system 214. The temperature of the heated air can be controlled by the heating system 220 and ventilation system 218 between an upper and lower temperature limit. In these examples, the lower limit is equal to the ambient air temperature. The ambient air temperature is the temperature outside of airship 200 in these examples. The upper temperature may be limited by the material properties of the surfaces that contain the heated air. Many materials become weak or deteriorate above a certain temperature limit. Alternatively, heat losses to external, ambient air may become excessive at some temperature limit.

With respect to controlling the buoyancy of airship 200, lighter than air gas 212 expands according to altitude in such a way that its buoyancy remains approximately constant with altitude. In these examples, lighter than air gas 212 may be helium. As the altitude of airship 200 increases, the helium expands. This expansion may cause a corresponding amount of heated air to be expelled depending on the design of gas storage system 212 and air storage system 214. A reduction in heated air volume results in diminished buoyancy. Overall buoyancy of airship 200 may be maintained constant by increasing the hot air temperature as altitude increases.

In these examples, heated air 225 in air storage system 214 is able to "breathe" in and out as the altitude varies. Unlike lighter than air gas 226 in gas storage system 212, heated air 225 is not sealed within air storage system 214.

With airship 200, the maximum altitude at which neutral buoyancy can be maintained is limited by the hot air temperature limit. Other factors that may limit the maximum altitude include, for example, the fraction of buoyancy provided by the helium temperature relationship. At the maximum altitude at which neutral buoyancy can be maintained, the helium may have expanded in gas storage system 212, but a sufficient amount of hot air volume may remain in air storage system 214 to allow airship 200 to climb to higher altitudes without reaching the lifting gas volume limit. In the illustrative example, this limit may be approximately 40,000 feet. Above the maximum altitude at which neutral buoyancy can be maintained for airship 200, buoyancy is less than the vehicle weight.

Although the altitudes reachable by airship 200 may be limited by buoyancy limits, airship 200 may reach even higher altitudes using aerodynamic lift features 210. These aerodynamic lift features may be used to augment buoyancy. Aerodynamic lift features 210 may enable higher altitudes to be reached for a given amount of power that may be provided by propulsion system 222. Also, aerodynamic lift features 210 may include the width of the airship.

In the different advantageous embodiments, the total volume of the shell 202 may be determined in part by the ratio of minimum buoyancy, provided by the lifting gas, to the total vehicle weight. In the illustrative examples, helium has much lower density than heated air at practical temperatures. As a result a pure heated-air airship must therefore be much larger in volume than a pure helium airship. This effect is compounded by the increased weight of the larger shell. The larger airship also is larger because the larger shell weighs more.

Also, an airship that provides buoyancy equal to half the total weight with helium will fall between a pure heated-air airship and a pure helium airship in volume and total weight. Further, an airship that provides buoyancy equal to three-quarters of the total weight with helium will fall between the "half-helium" and pure helium airship in volume and weight.

Consequently, a hybrid thermal airship, such as airship 200, pays a volume and weight penalty compared to a pure helium airship. This penalty may be compensated by the ability to provide adjustable buoyancy over a range of operationally useful weights. In the depicted examples, it is possible to create near-neutral buoyancy for any weight of airship 200 from empty weight to maximum weight. In this example, the empty weight excludes fuel and any payload, while the maximum weight includes fuel and payload in airship 200. This feature provides tremendous operational flexibility over current existing airships.

In some embodiments, the range at which near neutral buoyancy may be present can be reduced depending on the applications. Some operational limitations may be imposed in exchange for a reduced penalty in vehicle size and weight. For example, an operational limitation may be present, restricting the minimum weight of airship 200 to include some portion of the fuel and/or payload. This design may complicate operations, but overall costs may be reduced due efficiencies provided by a smaller, lighter vehicle.

The illustration of different components for airship 200 in FIG. 2 are provided for purposes of illustrating some features that may be found in different advantageous embodiments. This illustration is not meant to limit the manner or architecture in which different advantageous embodiments may be implemented. For example, in some advantageous embodiments, cargo storage system 216 may be located within gondola 224, rather than being built into shell 202. Additionally, in other different advantageous embodiments, Airship 200 may include other features in addition to or in place of the ones illustrated in FIG. 2. For example, airship 200 also may include landing gear.

With reference now to FIG. 3, a diagram illustrating a top cross-sectional view of an airship is depicted in accordance with an advantageous embodiment. In this example, airship 300 is an example of one embodiment of airship 200 in FIG. 2. In this example, airship 300 includes shell 302, which contains two types of cells. Cells, such as cell 304, may store both helium and hot air.

In this example, section 306 in cell 304 stores helium, while section 308 may store hot air. A second type of cell is a cell, such as cell 310, which stores only hot air in these examples. Further, in the different advantageous embodiments, each of the cells, containing helium or helium and hot air, are designed such that the bag or container holding the helium may reduce in size with respect to the rest of the cell. For example, section 306 may reduce in size within cell 304 increasing the area for section 308.

With reference now to FIG. 4, a cross-sectional side view of an airship is depicted in accordance with an advantageous embodiment. In this example, airship 300 is shown in a side view in which another view of cell 310 may be seen, as well as another view of cell 304. As can be seen, these two different types of cells may store gas for a gas storage system and an air storage system.

Figure 5:
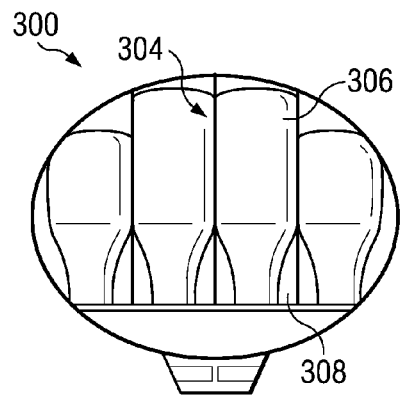
FIG. 5 is a cross-sectional front view of an airship in accordance with an advantageous embodiment.

With reference now to FIG. 5, a cross-sectional front view of an airship is depicted in accordance with an advantageous embodiment. In this figure, another view of cell 304 may be seen. The portion of the cell containing helium is shown at a high altitude in these different views. At lower altitudes, section 306 may decrease in volume to allow more air to be placed into section 308. In this example, both helium and hot air are stored in the same cells.

Figure 6:
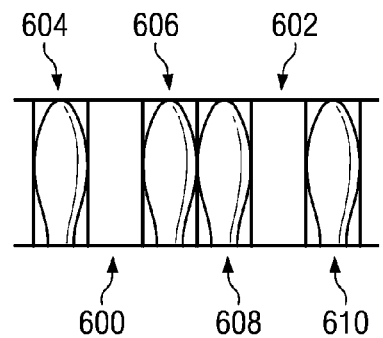
FIG. 6 is a cross-sectional view of gas cells in accordance with an advantageous embodiment.

With reference now to FIG. 6, a cross-sectional view of gas cells is depicted in accordance with an advantageous embodiment. In this example, cells 600, 602, 604, 606, 608, and 610 are examples of cell that may be located within the shell of an airship, such as airship 300 in FIG. 3. In this example, lighter than air gas and heated air are located in different cells.

As depicted, cell 600 and cell 602 may contain just heated air, while cell 604, 606, 608, and 610 may contain another lighter than air gas. The different types of cells and configurations for the cells illustrated in FIGS. 3-6 are examples of some configurations. Of course, in other advantageous embodiments, various configurations and architectures may be employed.

Figure 7:
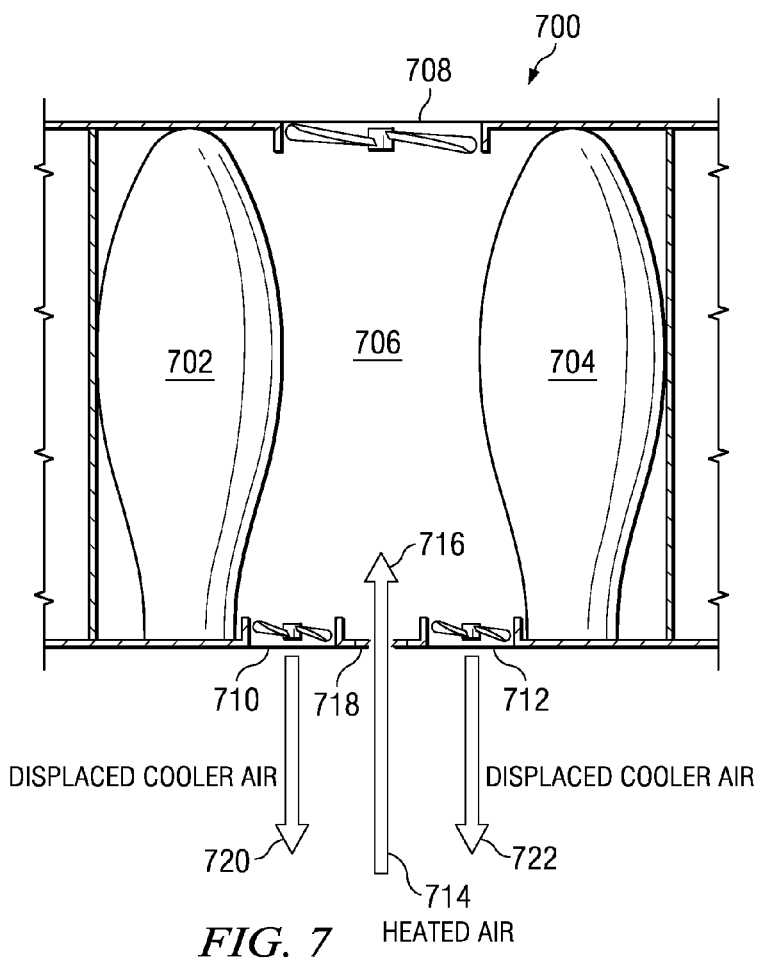
FIG. 7 is a diagram illustrating increasing the temperature of heated air in a cell in accordance with an advantageous embodiment.

With reference now to FIG. 7, a diagram illustrating increasing the temperature of heated air in a cell is depicted in accordance with an advantageous embodiment. In this example, cell 700 includes both heated air and lighter than air gas. The lighter than air gas is stored in bags 702 and 704 within cell 700. Bags 702 and 704 are sealed such that the lighter than air gas is retained within bags 702 and 704.

Section 706 includes controllable vents 708, 710, and 712. These controllable vents also may include inlet fans that may be used to push air into and out of section 706.

In this example, heated air 714 enters section 706 through inlet 718. Heated air 714 moves in a direction of arrow 716 through inlet 718. As heated air 714 enters section 706, cooler air may exit section 706 through controllable vents 710 and 712 in the direction of arrows 720 and 722. If inlet fans are present within controllable vents 710 and 712, cooler air may be drawn out more quickly through controllable vents 710 and 712. This drawing out of air also may increase the speed at which heated air 714 enters section 706.

This movement of air may be used to increase the amount of heated air within section 706 in cell 700. This increase in heated air in cell 700 may increase the buoyancy of the airship.

Figure 8:
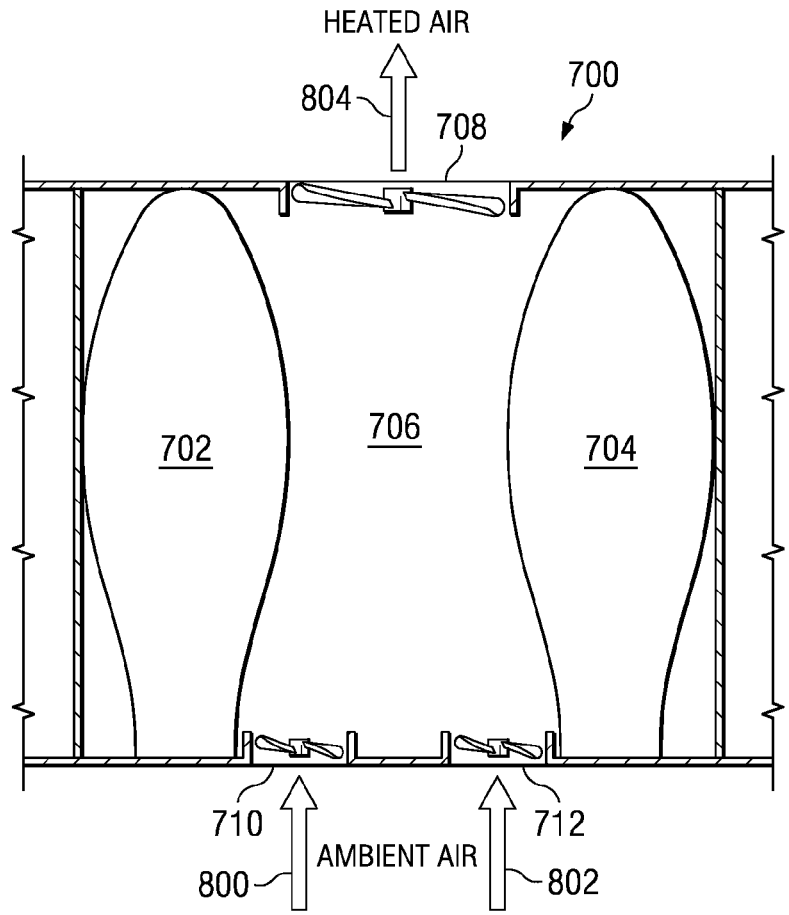
FIG. 8 is a diagram illustrating the cooling or removal of heated air from cells in accordance with an advantageous embodiment.

With reference now to FIG. 8, a diagram illustrating the cooling or removal of heated air from cells is depicted in accordance with an advantageous embodiment. In this example, ambient air may be introduced into section 706 of cell 700 through controllable vents 710 and 712 in the direction of arrows 800 and 802. The movement of air through controllable vents 710 and 712 may be accomplished through the use of inlet fans that may be integrated within controllable vents 710 and 712.

Movement of cooler and/or ambient air into section 706 may cause heated air to move out of section 706 through controllable vent 708 in the direction of arrow 804. In this manner, the cooling of heated air within cell 700 may decrease the buoyancy of the airship.

Figure 9:
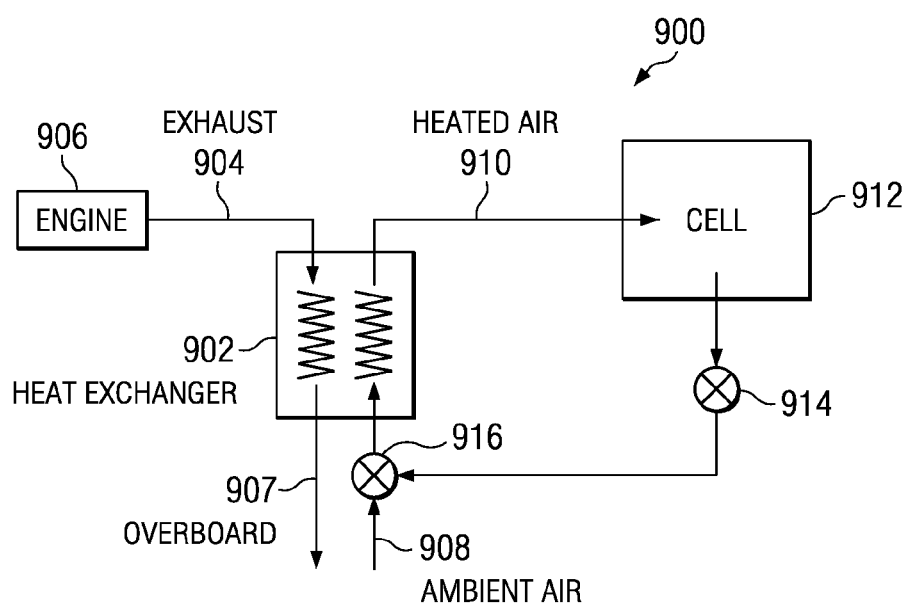
FIG. 9 is a diagram of a heating system in accordance with an advantageous embodiment.

With reference now to FIG. 9, a diagram of a heating system is depicted in accordance with an advantageous embodiment. In this example, heating system 900 is an example of one implementation of heating system 220 in FIG. 2. In this illustrative example, heating system 900 includes heat exchanger 902. Heat exchanger 902 may receive heat in the form of exhaust 904 from engine 906.

Exhaust 904 enters heat exchanger 902 and then exits overboard 907. As exhaust 904 passes through heat exchanger 902, heat from exhaust 904 heats ambient air 908 within heat exchanger 902. Ambient air 908 forms heated air 910 and enters cell 912. Heated air 910 may displace air within cell 912. This displaced air from cell 912 may exit as ambient air 908. The exit of air from cell 912 may be controlled by controllable vent 914. Additionally, the entry of ambient air 908 into heat exchanger 902 may be controlled by controllable vent 916.

If controllable vent 916 is closed and controllable vent 914 is open, heated air 910 may enter cell 912 and exit cell 912 to be heated to a higher temperature before returning to cell 912. This loop may more quickly increase the temperature of heated air 910 within cell 912 as opposed to merely heating ambient air 908. In this example, cell 912 may take various forms. For example, cell 912 may be a cell such as, for example, without limitation, cell 700 in FIG. 7, cell 602 in FIG. 6, cell 304 in FIG. 3, or some other suitable cell for holding heated air.

Figure 10:
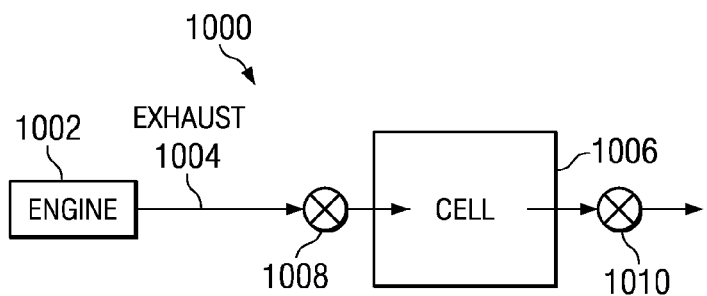
FIG. 10 is a diagram of a heating system in accordance with an advantageous embodiment.

With reference now to FIG. 10, a diagram of a heating system is depicted in accordance with an advantageous embodiment. In this example, heating system 1000 includes engine 1002. In this example, exhaust 1004 from engine 1002 may enter cell 1006 under the control of controllable vent 1008. In this illustrative embodiment, cooler air may enter and exit cell 1006 through controllable vent 1010. This type of heating system is an example of direct exhaust injection to cell 1006. Cell 1006 may take various forms. For example, without limitation, cell 1006 may be implemented using a cell, such as cell 304 in FIG. 3, cell 606 in FIG. 6, cell 700 in FIG. 7, or some other suitable cell architecture or design.

Figure 11:
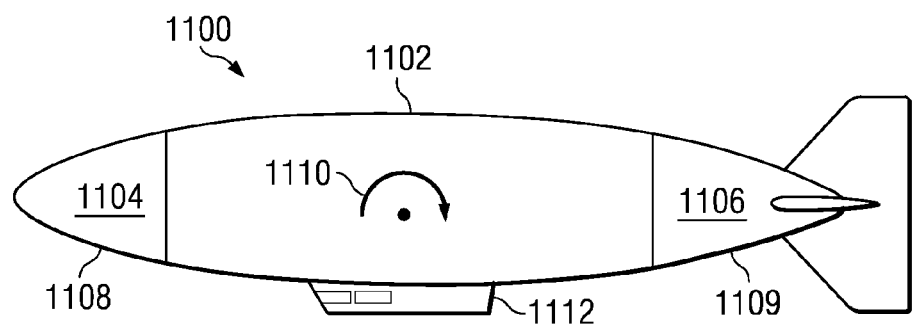
FIG. 11 is a diagram illustrating asymmetrical buoyancy forces in a bow and stern section of an airship in accordance with an advantageous embodiment.

With reference now to FIG. 11, a diagram illustrating asymmetrical buoyancy forces in a bow and stern section of an airship is depicted in accordance with an advantageous embodiment. In this example, airship 1100 may controllably heat and cool different cells within an air storage system to control the pitching moment of airship 1100. In this example, gas storage system 1102 may include section 1104 and section 1106. Section 1104 is located in bow 1108, while section 1106 is located in stern 1109 of airship 1100. The temperature of heated air within section 1104 and section 1106 may be different to generate different moments of force.

For example, the heat within section 1104 may introduce a lifting force that is greater than the lifting force generated by the heated air in section 1106. As a result, a net pitching moment in the direction of arrow 1110 may be generated. A reverse net pitching moment may be generated by heating the air in section 1106 to a greater extent than the air in section 1104. This differential heating may be used to adjust for differences in weight in different portions of airship 1100 that may occur. These differences in weight may be caused by cargo being present within gondola 1112 or through structural or design features in airship 1100.

Figure 12:
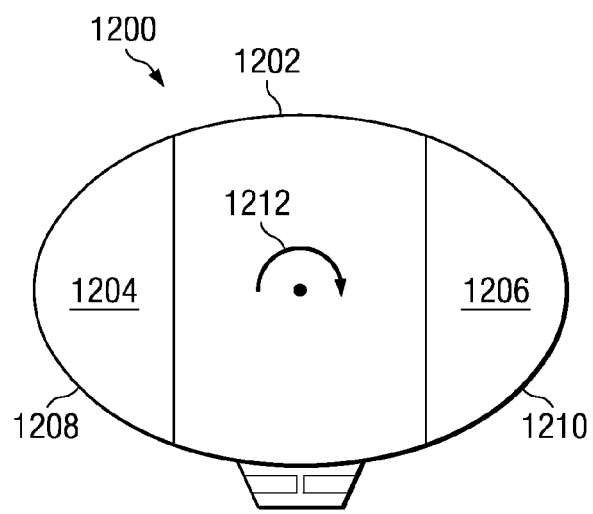
FIG. 12 is a diagram illustrating asymmetrical buoyancy forces in a starboard and port side of an aircraft in accordance with an advantageous embodiment.

With reference now to FIG. 12, a diagram illustrating asymmetrical buoyancy forces in a starboard and port side of an airship is depicted in accordance with an advantageous embodiment. In this example, airship 1200 includes air storage system 1202. Section 1204 is located on starboard side 1208, while section 1206 is located on port side 1210 in these examples. Section 1204 may be heated more than section 1206 to generate a greater upward force in section 1204. This results in a net rolling moment as indicated by arrow 1212. A reverse net rolling moment may be generated by heating section 1206 more than section 1204 to increase the force upward on section 1206.

Of course, in different advantageous embodiments, an airship may be divided up into sections to control both net rolling and net pitching moment of an airship. The number of sections that may be present may differ, depending on the particular implementation. For example, some airships may include two sections, while other airships may include four sections, eight sections, twenty sections, or some other suitable number of sections. The number and/or location of sections may depend on the design of the airship.

Figure 13:
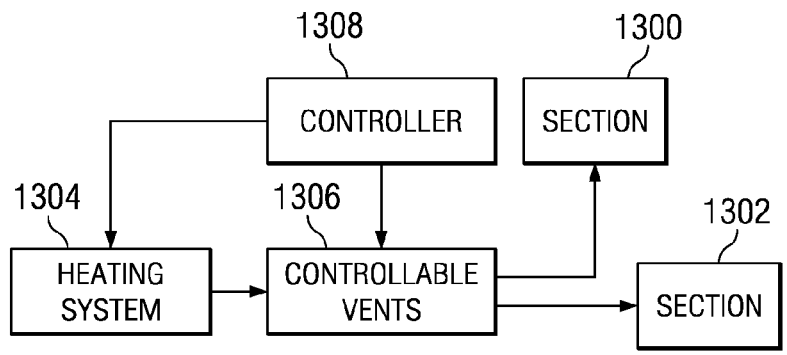
FIG. 13 is a block diagram of a control system in accordance with an advantageous embodiment.

With reference now to FIG. 13, a block diagram of a control system is depicted in accordance with an advantageous embodiment. In this example, sections 1300 and 1302 are examples of sections that may be present in an airship, such as airship 1100 in FIG. 11 or airship 1200 in FIG. 12. In these examples, heated air is sent to sections 1300 and 1302 from heating system 1304 through controllable vents 1306. These controllable vents may be set and/or configured to send different amounts of heated air to sections 1300 and 1302.

The different amounts of heated air may generate different buoyant forces in these different sections. For example, if more heated air from heating system 1304 is sent to section 1300, section 1300 generates more lifting or buoyancy forces than section 1302. The control of the heated air sent to sections 1300 and 1302 through controllable vents 1306 may be controlled by controller 1308.

Controller 1308 may take various forms, such as, for example, a computer, a line replaceable unit, a dedicated controller, or some other suitable control mechanism. Control 1308 may be under the control of a navigation computer or a human operator, depending on the particular implementation.

With respect to aerodynamic lift features, the different advantageous embodiments recognize that the aerodynamic characteristics of an airship may be improved by increasing a parameter of the airship, such as width or height by widening the typically circular cross-section of an airship. The different advantageous embodiments also recognize that some problems occur from this type of change in the design of airships. The different advantageous embodiments recognize that the surface area or two dimensional perimeter increases if the volume remains the same.

The different advantageous embodiments recognize that one problem is how to minimize the increase in the surface area for a specified increase while maintaining the same volume. The different advantageous embodiments also recognize that a circular cross-section maintains a shape when pressurized. A skin of an airship may be flexible and an inflated shape remains circular. In contrast, with a widened shape for an airship, the different advantageous embodiments recognize that a rigid structure may be required to maintain the shape under pressure. The different advantageous embodiments recognize that it is desirable to minimize the amount of rigid structure in an airship.

Further, the different advantageous embodiments recognize that the effective width with aerodynamic lift is reduced by air wrapping around the body in airships with circular cross-sections. Thus, the different advantageous embodiments recognize that instead of separating at the widest point, the air wraps around and separates a point inboard of the maximum half breadth. The different advantageous embodiments recognize that airship designs may include a mechanism to force separation at the widest point to achieve the greatest possible benefit of the width.

The different advantageous embodiments also recognize that many currently existing solutions may require greater surface air than desired. The increase in surface air increases the weight and drag with respect to the optimal shape, volume, and width. Further, the different advantageous embodiments also recognize that currently used solutions may employ a discrete wing. These types of features, however, may increase the weight and cost of the airship.

Thus, the different advantageous embodiments provide a method and apparatus for selecting a cross section shape with a minimum perimeter for a specified area and width. The different advantageous embodiments may be applied to airship designs with cross-sections that are wider than a circle of a specified area. These types of shapes may be achieved using a flexible skin under pressure with some supporting structure. An entirely rigid structure is not required using the different advantageous embodiments.

Further, the different advantageous embodiments also provide shapes that promote air flow separation at a maximum half breadth. The term "maximum half-breadth" refers to the point in the cross section of a shell of an airship at which the distance between the cross section and the vertical plane of symmetry (the vertical centerline) is the greatest. In other words, "maximum half-breadth" is the point of greatest width of an airship. Extended from the cross section to the shell as a whole, maximum half-breadth is the line along the side of the shell that follows the widest portion of the shell.

In this manner, effective aerodynamic width is increased. In these different advantageous embodiments, the design of these different shapes may be performed using a data processing system.

Figure 14:
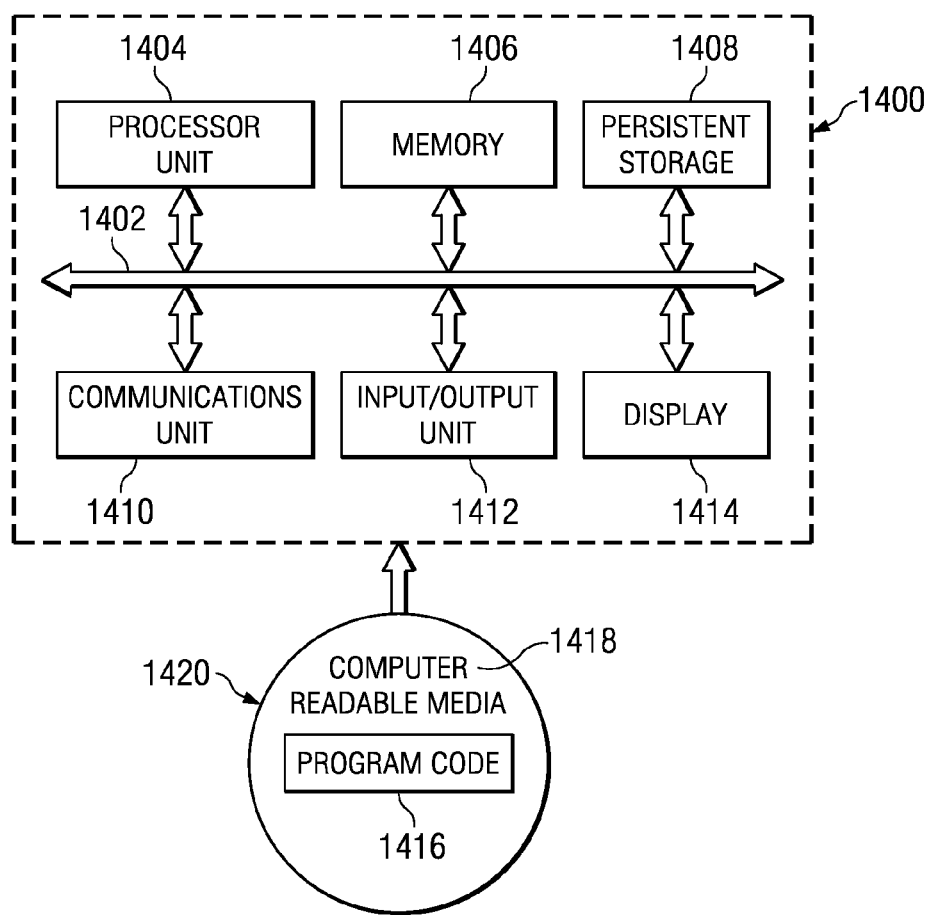
FIG. 14 is a diagram of a data processing system in accordance with an advantageous embodiment.

Turning now to FIG. 14, a diagram of a data processing system is depicted in accordance with an advantageous embodiment. In this illustrative example, data processing system 1400 includes communications fabric 1402, which provides communications between processor unit 1404, memory 1406, persistent storage 1408, communications unit 1410, input/output (I/O) unit 1412, and display 1414. In this example, data processing system 1400 may be used to design airships.

Processor unit 1404 serves to execute instructions for software that may be loaded into memory 1406. Processor unit 1404 may be a set of one or more processors or may be a multi-processor core, depending on the particular implementation. Further, processor unit 1404 may be implemented using one or more heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices. A storage device is any piece of hardware that is capable of storing information either on a temporary basis and/or a permanent basis. Memory 1406, in these examples, may be, for example, a random access memory or any other suitable volatile or non-volatile storage device. Persistent storage 1408 may take various forms depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard and mouse. Further, input/output unit 1412 may send output to a printer. Display 1414 provides a mechanism to display information to a user.

Instructions for the operating system and applications or programs are located on persistent storage 1408. These instructions may be loaded into memory 1406 for execution by processor unit 1404. The processes of the different embodiments may be performed by processor unit 1404 using computer implemented instructions, which may be located in a memory, such as memory 1406. These instructions are referred to as program code, computer usable program code, or computer readable program code that may be read and executed by a processor in processor unit 1404. The program code in the different embodiments may be embodied on different physical or tangible computer readable media, such as memory 1406 or persistent storage 1408.

Program code 1416 is located in a functional form on computer readable media 1418 that is selectively removable and may be loaded onto or transferred to data processing system 1400 for execution by processor unit 1404. Program code 1416 and computer readable media 1418 form computer program product 1420 in these examples. In one example, computer readable media 1418 may be in a tangible form, such as, for example, an optical or magnetic disc that is inserted or placed into a drive or other device that is part of persistent storage 1408 for transfer onto a storage device, such as a hard drive that is part of persistent storage 1408.

In a tangible form, computer readable media 1418 also may take the form of a persistent storage, such as a hard drive, a thumb drive, or a flash memory that is connected to data processing system 1400. The tangible form of computer readable media 1418 is also referred to as computer recordable storage media. In some instances, computer readable media 1418 may not be removable. Program code 1416 may include computer executable instructions to design airships with bi-convex shapes.

Alternatively, program code 1416 may be transferred to data processing system 1400 from computer readable media 1418 through a communications link to communications unit 1410 and/or through a connection to input/output unit 1412. The communications link and/or the connection may be physical or wireless in the illustrative examples. The computer readable media also may take the form of non-tangible media, such as communications links or wireless transmissions containing the program code.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown.

As one example, a storage device in data processing system 1400 is any hardware apparatus that may store data. Memory 1406, persistent storage 1408 and computer readable media 1418 are examples of storage devices in a tangible form.

In the different advantageous embodiments, the bi-convex shape is symmetrical and provides the smallest perimeter of any shape that spans a given width and encloses a given area assuming that the given width is greater than the diameter of a circle that enclosed the given area. This configuration provides an advantage over other currently used designs because this configuration tends to provide the minimum parasite drag of any "widened" airship shape.

Further, the bi-convex shape can be formed by an inflated membrane if the cusps of the shape (the end corners) are supported. This feature allows for a biconvex airship to be formed very simply from a membrane and a perimeter frame. Any other cross section other than a circle requires additional supporting structure in these examples. In other words the bi-convex shape in the different examples is "natural" and puts the membrane into pure tension. No bending strength is needed in the membrane to hold the shape.

Additionally, in the different advantageous embodiments, an airship with a convex shape may be oriented horizontally or vertically. A horizontal orientation is also referred to as a "widened" shape and may provide improved lifting characteristics. A vertical orientation can provide increased side area for a given airship weight and volume. This type of orientation of the shape can be advantageous if the airship is used for advertising. With a vertical orientation of the biconvex shape a larger sign is possible. This type of design can also be advantageous if the airship is used as an antenna platform. The enlarged side area can support a larger antenna for improved performance.

Figure 15:
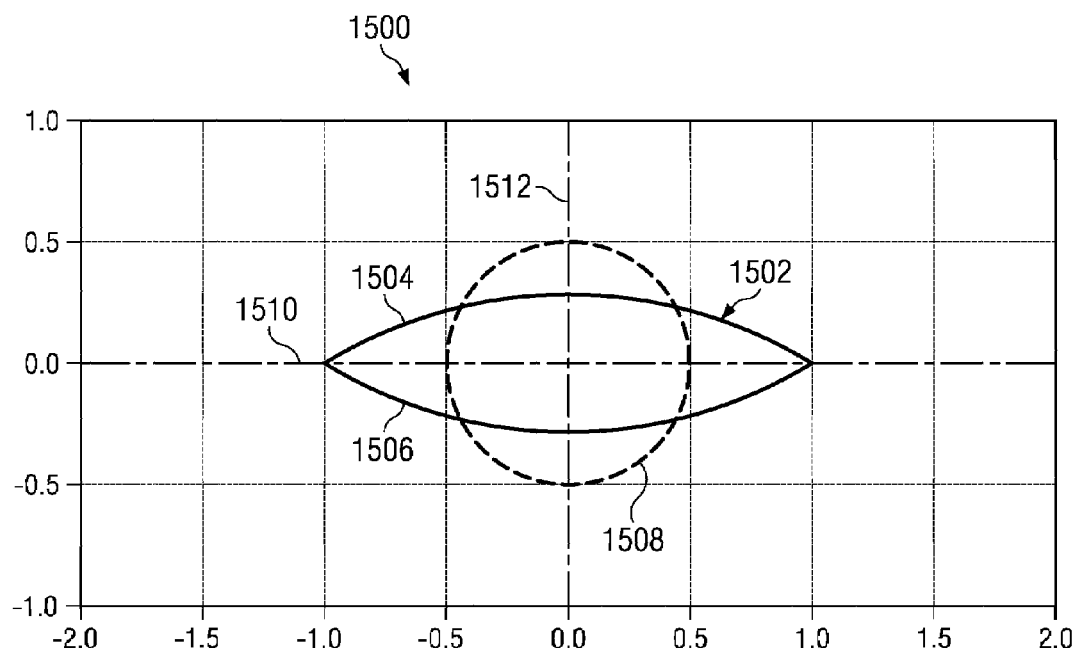
FIG. 15 is a diagram illustrating a bi-convex shape that may be used for an airship in accordance with an advantageous embodiment.

With reference now to FIG. 15, a diagram illustrating a bi-convex shape that may be used for an airship is depicted in accordance with an advantageous embodiment. In this example, display 1500 is an example of a display that may be generated using data processing system 1400 in FIG. 14. Bi-convex shape 1502 is formed from two curves, curve 1504 and curve 1506.

In this example, circle 1508 illustrates an equal area for a more conventional airship shape. In this example, bi-convex shape 1502 is symmetrical about horizontal axis 1510. Of course, asymmetry may be around a different axis, such as vertical axis 1512, depending on the particular implementation.

Figure 16:
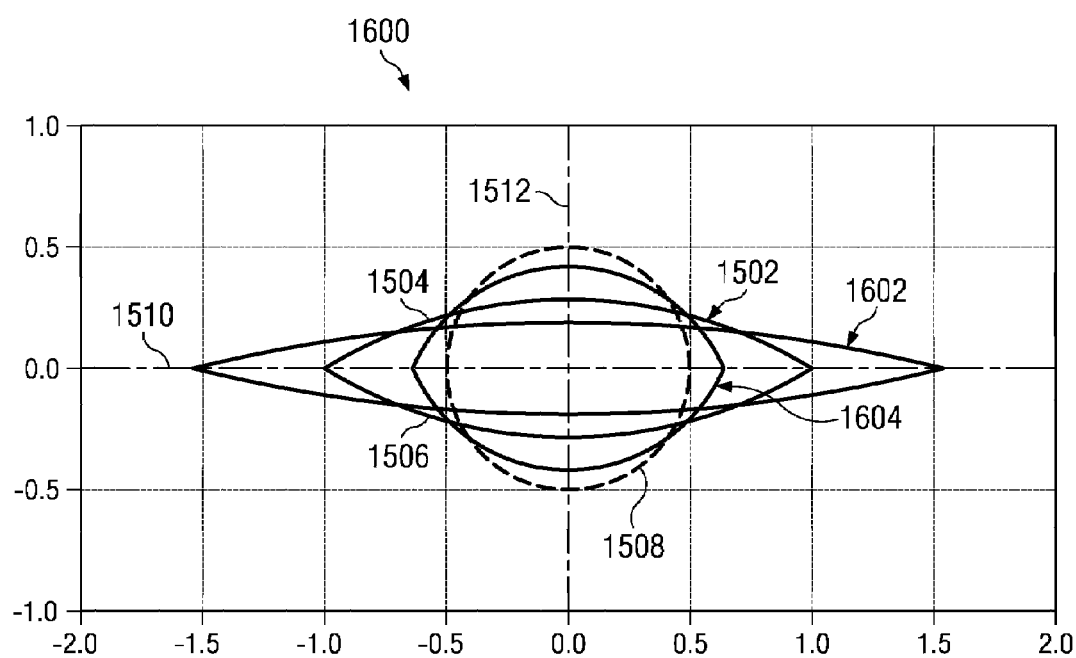
FIG. 16 is another example of a display presenting bi-convex shapes that may be used in airships in accordance with an advantageous embodiment.

With reference now to FIG. 16, display 1600 is another example of a display presenting bi-convex shapes that may be used in airships. The different shapes displayed in FIG. 16 may be generated using data processing system 1400 in FIG.

14. As can be seen in this example, additional bi-convex shapes, bi-convex shape 1602, and bi-convex shape 1604 are displayed in addition to bi-convex shape 1502. In this example, these different shapes have the same cross-section area as circle 1508. This illustration depicts an ability to adjust the span of the shape to any value greater than the diameter of circle 1508.

In the different advantageous embodiments, the perimeter of a shape increases with the increased span. Bi-convex shape 1604 has a span that is 1.25 times the diameter of circle 1508. Bi-convex shape 1502 has span that is twice the diameter of circle 1508, and bi-convex shape 1602 has a span that is three times the diameter of circle 1508. All of these shapes have the same cross-section area as circle 1508. The increase in perimeter of these shapes, however, may provide better aerodynamic lift features than currently used shapes.

Figure 17:
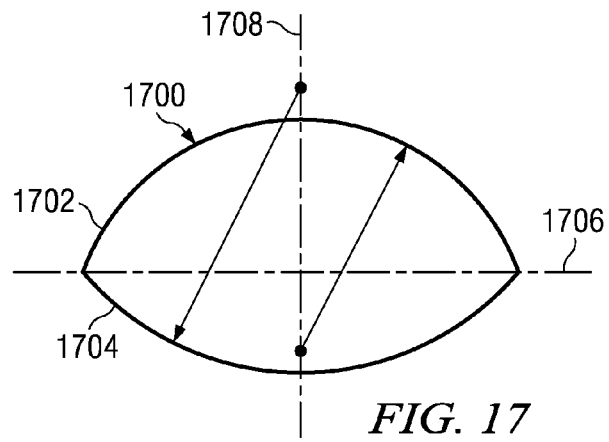
FIG. 17 is a diagram showing a cross-section for a bi-convex airship design in accordance with an advantageous embodiment.

With reference now to FIG. 17, a diagram showing a cross-section for a bi-convex airship design is depicted in accordance with an advantageous embodiment. In this example, bi-convex shape 1700 is an example of a cross-section that may be used in a design of an airship. In this example, bi-convex shape 1700 has curves 1702, and 1704. Curve 1702 has a shorter radius, while curve 1704 has a longer radius. As a result, bi-convex shape 1700 is not symmetrical about horizontal axis 1706, but is symmetrical about vertical axis 1708.

This illustrative example shows that the radius for the upper side of a cross-section may be different than the radius for the lower side of a cross-section at any given point, as shown by bi-convex shape 1700. This type of cross-sectional shape may be used to approximately equalize tension of an airship membrane. This type of equalization may be desirable because the pressure within the airship shell may be nearly equal throughout the shell. A vertical gradient may be present due to the weight of the helium in a given column of helium within the shell. As a result, a slight increase in pressure may occur on the lower surface.

A similar pressure gradient may be present in the air surrounding the airship. This gradient is much greater because of higher density of air. As a result, the differential pressure between the inside of the airship and the outside is greater at the upper portions of the airship. In this case, the design of the bi-convex shape may be made to reduce the tension in the upper surface of the airship by decreasing the radius of the arc defining this portion of the bi-convex shape.

Alternatively, with the lower surface of the airship having less stress, the radius of this portion of the bi-convex shape may be increased to make the airship flatter. Further, both the upper and lower radii may be changed to equalize tension in both upper and lower surfaces. This type of equalization may be performed by decreasing the upper radius and increasing the lower radius.

Figure 18:
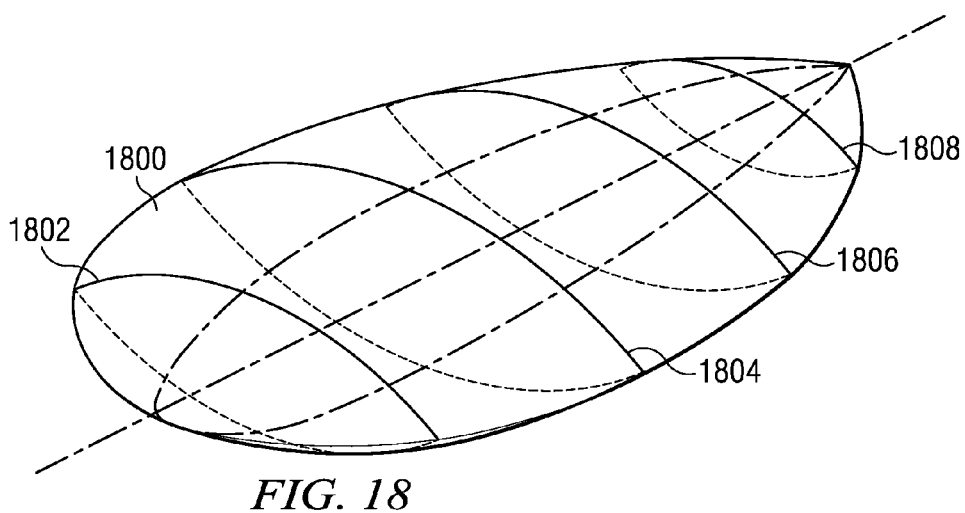
FIG. 18 is an illustration of an airship shell design in accordance with an advantageous embodiment.

With reference now to FIG. 18, an illustration of an airship shell design is depicted in accordance with an advantageous embodiment. In this example, shell 1800 is an example of an airship shell that may be generated from a bi-convex cross-section as illustrated in FIGS. 15 and 16. As can be seen in this example, shell 1800 is formed from different sizes of the same bi-convex shape, as shown by bi-convex shapes 1802, 1804, 1806, and 1808 in shell 1800.

Figure 19:
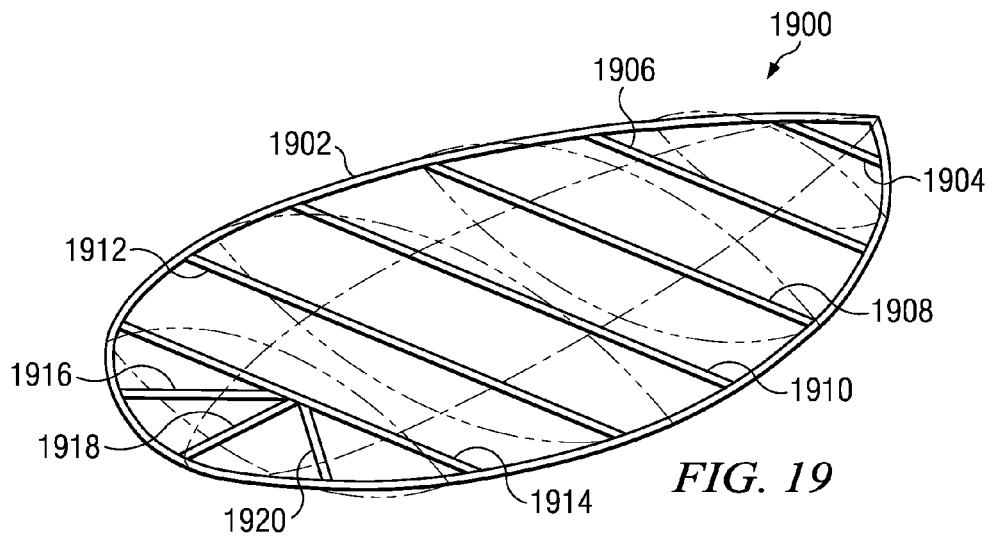
FIG. 19 is an example of a structure for an airship shell in accordance with an advantageous embodiment.

With reference now to FIG. 19, an example of a structure for an airship shell is depicted in accordance with an advantageous embodiment. In this example, structure 1900 is an example of one structure that may be used to resist tension forces imposed by inflated skin that may be formed for the shell of the airship. In this example, structure 1900 is substantially flat with perimeter section 1902 and cross-sections 1904, 1906, 1908, 1910, 1912, and 1914. Additional structural support is found through members 1916, 1918, and 1920. These members provide a structure that is not an entirely rigid structure, but also is not a non-rigid structure. This structure may be considered a semi-rigid structure for an airship.

Although the same width ratio is illustrated in these examples, this type of constant width ratio is not necessarily needed along the entire length of the airship. In some advantageous embodiments, the width ratio of the bi-convex curve used for the cross-sections of the airship may be varied.

Thus, the different advantageous embodiments allow an airship designer to improve aerodynamic lift features of an airship. These improvement and characteristics may be obtained with a minimum penalty to the surface area. By reducing the increase in surface area, factors such as parasitic drag may be minimized.

With these designs, the improved aerodynamic features may include, for example, reduced induced drag caused by the lift and increased lift curve slope with more lift per unit angle. These types of aerodynamic features may enable an airship to carry additional weight or carry a wider range of weight without the use of variable ballast. Further, this type of design may compensate for varying payloads or weight changes resulting from the consumption of fuel.

Further, the different advantageous embodiments of this design may be applied to rigid, semi-rigid, and non-rigid airships. For example, the different advantageous embodiments may be applied to the design of a blimp.

Figure 20:
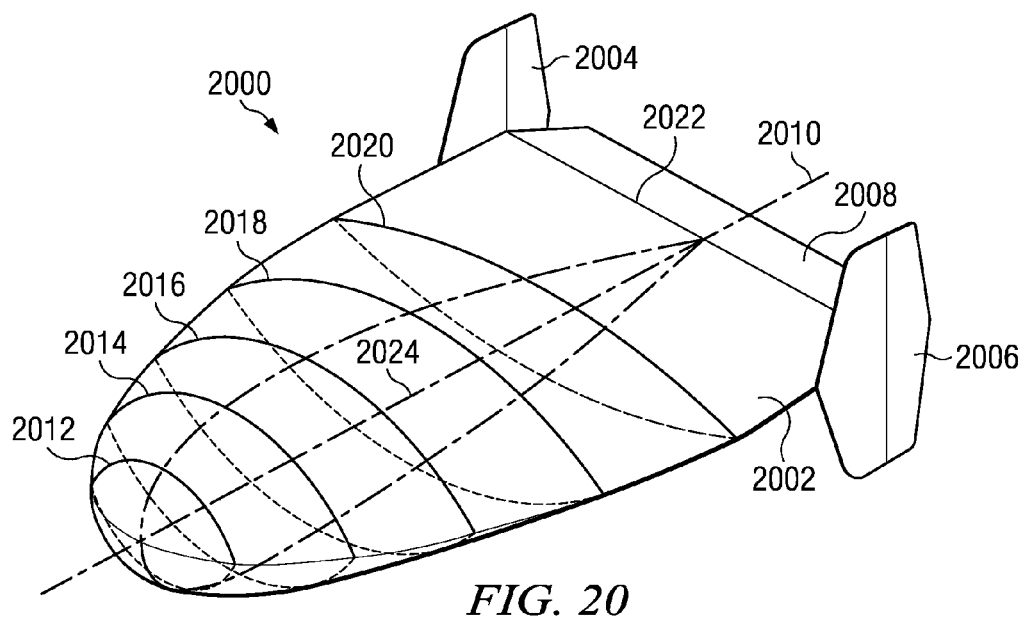
FIG. 20 is a diagram illustrating an example of a bi-convex airship in accordance with an advantageous embodiment.

With reference now to FIG. 20, a diagram illustrating an example of a bi-convex airship is depicted in accordance with an advantageous embodiment. In this example, bi-convex airship 2000 comprises shell 2002, fin 2004, fin 2006, and control surface 2008. Bi-convex airship 2000 contains a variation and cross-section width to height ratio along the length of bi-convex airship 2000 as shown by axis 2010. In this example, cross-section 2012 starts out as a nearly round or circular cross-section.

As depicted, bi-convex airship 2000 has greater proportional depth near the front and less proportional depth near the rear. Cross-sections 2014, 2016, 2018, and 2020 show a progression to a more horizontal cross-section with cross-section 2022 ending at a horizontal line for the hinge line of control surface 2008. In this manner, a larger size may be provided for control surface 2008. Additionally, this control surface may be used to align the aerodynamic center of airship 2000 with the center of buoyancy to improve pitch stability.

Airship 2000 is a horizontally widened bi-convex airship in which the portion of width to height of lateral vertical cross-sections may vary along the length of airship 2000. In this example, greater proportional depth is present near the front of airship 2000 and less towards the rear. This type of shaping provides for increase volume forward and results in center buoyancy that is farther forward than would be present with the same profile in a constant proportional cross-section.

This type of design may more closely align the aerodynamic center of shell 2002 with the center of buoyancy to improve pitch stability. Additionally, varying these sections may provide a large trailing edge for control surface 2008. Vertical stabilizers 2004 and 2006 show one mechanism for providing yaw stability and control with rudders.

Figure 21:
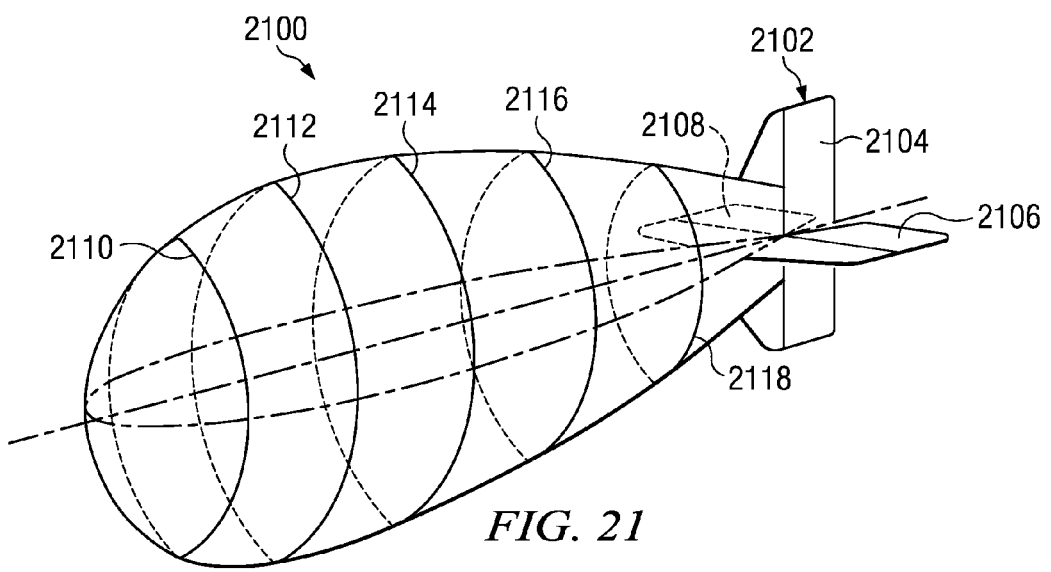
FIG. 21 is an illustration of a bi-convex airship design in accordance with an advantageous embodiment.

With reference now to FIG. 21, an illustration of a bi-convex airship design is depicted in accordance with an advantageous embodiment. In this example, airship 2100 has bi-convex cross-sections that are wider along a vertical axis as opposed to horizontal axis. Airship 2100 includes tail 2102, with tail surfaces 2104, 2106, and 2108. In this example, cross-sections 2110, 2112, 2114, 2116, and 2118 show a vertically elongated bi-convex shape for airship 2100. Cross-section 2110 is smaller than cross-section 2112. The size of the bi-convex shape decreases in the cross-sections progressing from cross-sections 2114, 2116, and 2118.

Figure 22:
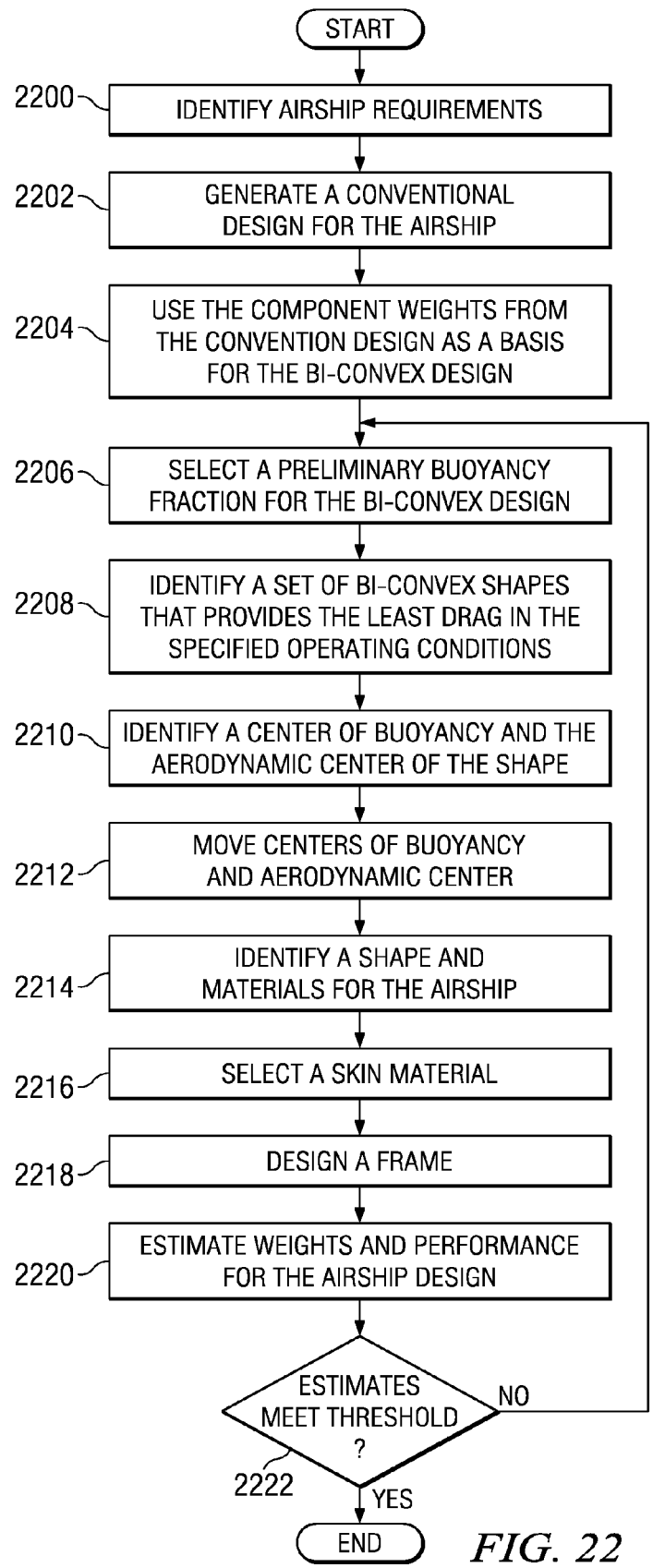
FIG. 22 is a flowchart of a process for designing a bi-convex airship in accordance with an advantageous embodiment.

With reference now to FIG. 22, a flowchart of a process for designing a bi-convex airship is depicted in accordance with an advantageous embodiment. This design may be performed using a data processing system, such as data processing system 1400 in FIG. 14.

The process begins by identifying airship requirements (operation 2200). These airship requirements may include, for example, payload weight, maximum required speed, and/or maximum altitude. The process generates a conventional design for the airship (operation 2202). In operation 2202, this convention design may be made using current design methods for creating airships. This design is used as a baseline design for comparison to alternative configurations in this process. The process then uses component weights from the convention design as a basis for the bi-convex design (operation 2204).

Next, the process selects a preliminary buoyancy fraction for the bi-convex design (operation 2206). The buoyancy fraction is the buoyancy divided by the maximum takeoff gross weight for the airship. The maximum takeoff gross weight includes the weight of the airship, the cargo that the airship may carry, and any fuel or other items that may add to the weight. The buoyancy fraction may influence the volume of the ship, takeoff characteristics, and flight characteristics. A low buoyancy ratio permits a wider range of fuel and payload weight variations by retaining negative or neutral buoyancy.

The process then identifies a set of bi-convex shapes that provides the least drag in the specified operating conditions (operation 2208). The operating conditions may be obtained from the airship requirements identified in operation 2200. In these examples, a widened bi-convex cross-section includes an upper arc and a lower arc. The width to height ratio of this cross-section is the portions of the rectangle into which the arcs may be inscribed.

Assuming that the upper and lower lobes of the cross-section are symmetrical, the upper lobe may be formed as an arc through three points. These points are the mid point of one side of the rectangle, a mid point of the upper edge of the rectangle, and the mid point of the other side of the rectangle. The lower lobe uses the same side mid points and the mid point of the lower edge of the rectangle. In this manner, different radii for the upper and lower lobes may be used.

In selecting a set of bi-convex shapes, variations in the width to height ratio of the bi-convex shape may be explored to identify a proportion that provides the least drag in the specified operating conditions. Generally, a lobe buoyancy ratio for low cruise speeds may likely favor wider proportions for these cross sections. In these examples, the sum of the profile drag and induced drag at flight conditions may be minimized using different proportions of the height and weight ratio. Profile drag is approximately proportional to the airship surface area, and induced drag is approximately proportional to 1/width squared.

In the different advantageous embodiments, the surface area goes up for a given volume with increasing width. As a result, an optimal width with minimum combination of total drag may be identified in operation 2208.

The induced drag force of an air vehicle follows the well-known Equation 1 below:

$$\text{Induced drag force} = 2 \times L^2 / (rho \times V^2 \times Pi \times e \times b^2), \quad \text{Equation 1.}$$

Where: induced drag force is in pounds, L is lift force in pounds, Rho is air density in slugs per cubic foot, V is true airspeed in feet per second, Pi is the constant 3.14159 . . . , e is the Oswald efficiency factor, typically between 0.8 and 1.0, and b is wing span, in feet.

$$\text{Lift force} = \tfrac{1}{2} \times rho \times V^2 \times Cl \times S, \quad \text{Equation 2.}$$

Where: lift force is in pounds, Cl is the non-dimensional lift coefficient, S is the wing or reference area (generally projected onto a horizontal plane), and other variables are as for Equation 1 above.

The process identifies a center of buoyancy and the aerodynamic center for the selected bi-convex shape (operation 2210). In the different advantageous embodiments, the process also moves the centers to increase the alignment between the centers (operation 2212). The center of buoyancy is point within the airship about which the moments from the lift of all buoyant elements sum to zero. The center of gravity is the point within the airship about which the moments from massive elements in a gravitational field or in a linear acceleration sum to zero.

The aerodynamic center is the lateral axis about which the pitching moment coefficient of the airship remains constant as angle of attack is varied. The pitching moment coefficient is nominally a constant value used in an equation that relates dynamic pressure and geometry to the vehicle pitching moment also referred to as torque.

Locating the center of gravity of the airship above, below or directly on the center of buoyancy, is desirable in designing the airship. This location results in a balanced airship during hover. The buoyancy forces cancel the gravitational forces minimizing or eliminating a tendency to pitch or roll.

Pitch stability is determined by the relationship of the center of gravity and the aerodynamic center. An airship with the center of gravity ahead of the aerodynamic center will tend to be stable in pitch. This airship vehicle will naturally return to a trimmed pitch attitude after a disturbance and will maintain a steady trimmed pitch attitude in smooth air.

An airship with the center of gravity at the aerodynamic center will be neutrally stable in pitch. Such an airship will not naturally return to a trimmed pitch attitude after a disturbance but will maintain a steady trimmed pitch attitude in smooth air. A return to a trimmed pitch attitude requires an active control surface deflection or other measure.

An airship vehicle with the center of gravity behind the aerodynamic center will be unstable in pitch. Such an airship vehicle will not naturally return to a trimmed pitch attitude after a disturbance and will not maintain a steady trimmed pitch attitude. This type of airship requires constant adjustment of the pitch control devices to counter the tendency of the airship to diverge from the present angle of attack. This divergent tendency has a characteristic time period that influences the required flight control system performance.

As the center of gravity moves farther behind the aerodynamic center, the characteristic time period decreases and the flight control system performance requirements become more stringent. Airships are so large that their characteristic time periods are quite long. This type of time period can permit increased distances between the center of gravity and the aerodynamic center without placing impractical demands on the control system. Because the center of buoyancy and center of gravity are preferably aligned, the relationship outlined above between the aerodynamic center and the center of gravity also applies to the relationship between the aerodynamic center and the center of buoyancy.

In these examples, the aerodynamic center may be moved aft by adding a horizontal tail to the airship design. The center buoyancy may be varied or moved by moving the point of maximum width or maximum depth forward or backwards. By moving the maximum width or depth forward, the center of buoyancy may be moved forward and by moving the maximum depth backwards in the design, the center of buoyancy may be moved backwards.

Alternatively, the proportions of the cross-section may be varied along the length of the airship to change these different centers. Further, changes in the centers may be performed with respect to estimates of flight stability and control. As a result, different height and width proportions for the airship may result from moving the centers to increase alignment.

The process then identifies a shape and materials for the airship (operation 2214). In this example, the internal pressure of the airship may be identified using known processes. The stress in the upper and lower lobes may vary as shown in equation 3 below:

$$\text{Stress} = r*P/t, \quad \text{Equation 3.}$$

In equation 3, stress is in pounds per square inch, P is pressure in pounds per square inch, r is the radius of the lobe in inches, and t is the thickness of the lobe material in inches.

Equation 3 is an approximation that considers stresses in the lateral direction and does not consider stresses in the longitudinal direction. The pressure used in equation 3 is the differential pressure between the inside and outside of the shell of the airship and may take in account the variation of pressure that may be caused by aerodynamics.

The process may select a skin material (operation 2216). This skin material may be selected having various factors such as, without limitation, thickness, desirable stress level, and desired margin of safety. Every material has limitations to its strength. In actual application in a structural system, uncertainties are present for the materials. These uncertainties include, for example, the actual load that the material will experience in service; the uniformity of construction methods for the materials; the potential damage during the period of service; fatigue, corrosion, weathering, and other factors that may tend to weaken the material.

A margin of safety may be applied to the application of each material to account for these uncertainties. This margin is applied on top of operating limits that are exceeded very rarely, such as once per million flight hours. The process then designs a frame for the airship (operation 2218). A frame may be designed to support various forces, such as those in the junction between the upper lobe and the lower lobe from the skin material that may tend to move the left and right lobes toward each other. This force is the vector sum of the skin tension of the upper and lower lobes.

These forces may take into account the design of the frame in operation 2218. A frame may be designed to resist the forces exerted by the upper and lower lobes. Further, in designing the frame, a perimeter frame may be used to provide a location to attach various components, such as, for example, a gondola, a propulsion system, and a tail. Further, these additional loads also may be considered in the design of the frame in operation 2218. The process then estimates the weights and performance for the airship design (operation 2220).

A determination is made as to whether the weights and performance of the airship design meet a threshold or design specification (operation 2222). If the design meets the threshold, the process terminates with the design being complete. If the design does not meet the thresholds for these parameters, the process may return to operation 2206 to select another preliminary buoyancy fraction. In other advantageous embodiments, the process also may return to operation 2208 instead of operation 2206 depending on the particular implementation.

Figure 23B:
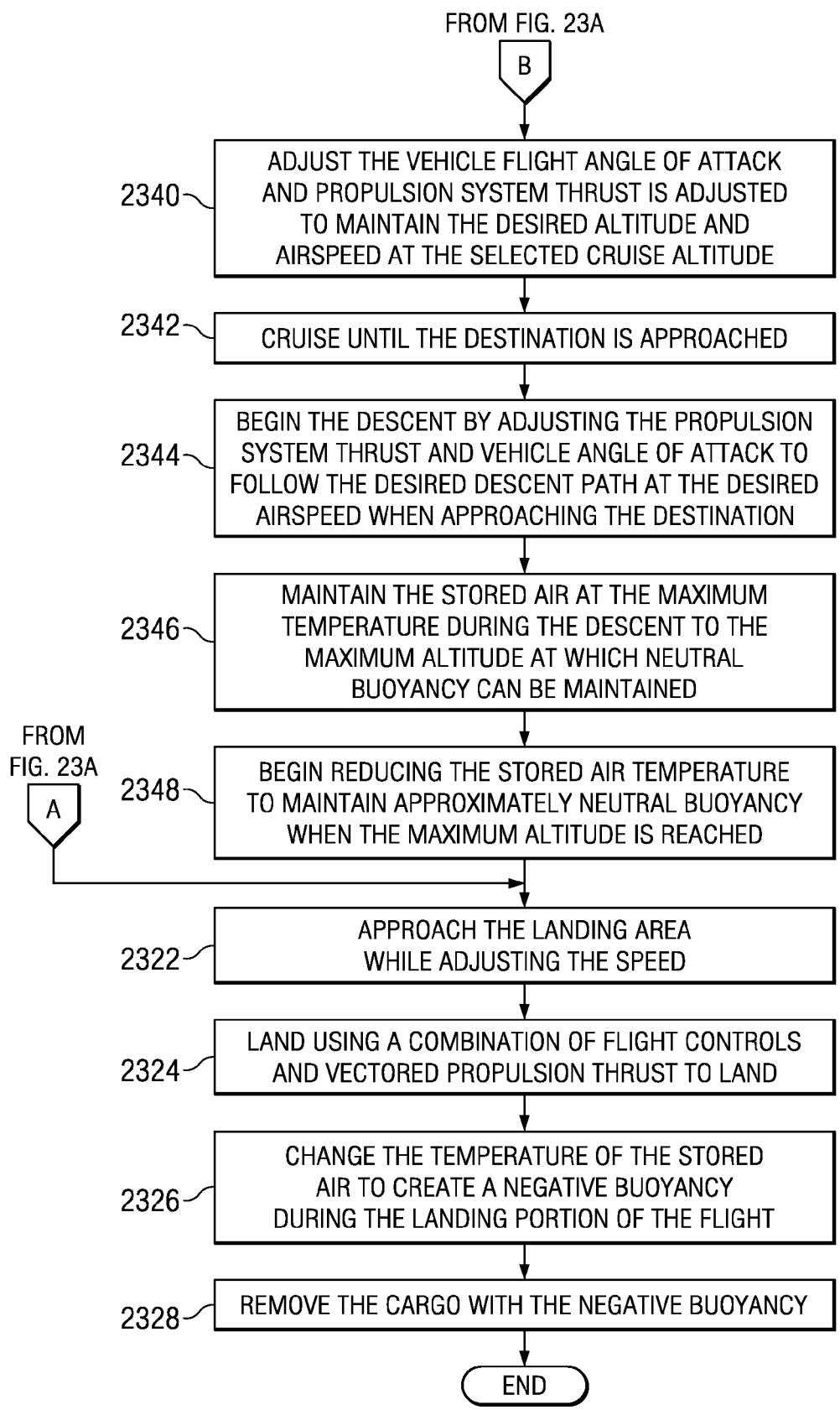

With reference now to FIGS. 23A and 23B, a flowchart of a process for moving cargo using an airship is depicted in accordance with an advantageous embodiment. In this example, cargo may be moved using an airship, such as airship 200 in FIG. 2. This airship may be a hybrid thermal airship having aerodynamic lift features, such as a bi-convex shape.

The process begins by controlling a temperature of air stored inside the airship to create a negative buoyancy (operation 2300). In this example, buoyancy is provided both by heated air and by lighter than air gas. Cargo is then placed into the cargo storage system while the negative buoyancy is present (operation 2302). After the cargo has been placed into the cargo storage system, the temperature of the stored air in the gas storage system is changed to create an approximately neutral or positive buoyancy for the airship (operation 2304). Thrust is then provided to the airship to generate movement and dynamic lift for the airship (operation 2306). Operation 2306 may be an optional one with respect to lifting the airship from the ground.

The optimal cruising altitude and airspeed is decided according to analysis of schedule, operational cost and wind conditions (operation 2308). If the climb is below the limit for neutral buoyancy, the airship climbs to the desired cruising altitude (operation 2310). During the climb, the temperature of the stored air is adjusted to maintain approximately neutral buoyancy (operation 2312). The airship then flies at the selected airspeed (operation 2314) and cruises until the destination is approached (operation 2316).

When approaching the destination, the airship begins the descent by altering the flight path of the vehicle with the pitch controls and adjusting the propulsion system thrust to maintain the desired airspeed (operation 2318). During the descent, the temperature of the stored air is adjusted to maintain approximately neutral buoyancy (operation 2320).

Next, the airship approaches the landing area while adjusting the speed (operation 2322). The airship then lands using a combination of flight controls and vectored propulsion thrust to land (operation 2324). The airship changes the temperature of the stored air to create a negative buoyancy during the landing portion of the flight (operation 2326).

The cargo is then removed with the negative buoyancy (operation 2328), with the process terminating thereafter. With reference to operation 2308, if the climb is above the limit for neutral buoyancy, the airship climbs to the altitude limit for neutral buoyancy (operation 2330). During the climb, the temperature of the stored air is adjusted to maintain approximately neutral buoyancy (2332). The climb of the airship continues by increasing the vehicle angle of attack to create aerodynamic lift (operation 2334). During the climb, the temperature of the stored air is maintained at the maximum temperature limit (Operation 2336).

The airship climbs at the selected airspeed to the selected altitude using variations in propulsion system thrust and vehicle angle of attack to control airspeed and climb path (operation 2338). At the selected cruise altitude, vehicle flight angle of attack and propulsion system thrust is adjusted to maintain the desired altitude and airspeed (operation 2340). The airship cruises until the destination is approached (operation 2342).

When approaching the destination, the airship begins the descent by adjusting the propulsion system thrust and vehicle angle of attack to follow the desired descent path at the desired airspeed (operation 2344). During the descent to the maximum altitude at which neutral buoyancy can be maintained, the stored the stored air is maintained at the maximum temperature (operation 2346). When this maximum altitude is reached, the stored air temperature is reduced to maintain approximately neutral buoyancy (operation 2348) with the process proceeding to operation 2322 as described above. Similar processes may be used to return the airship to its original destination or to another location.

Figure 24:
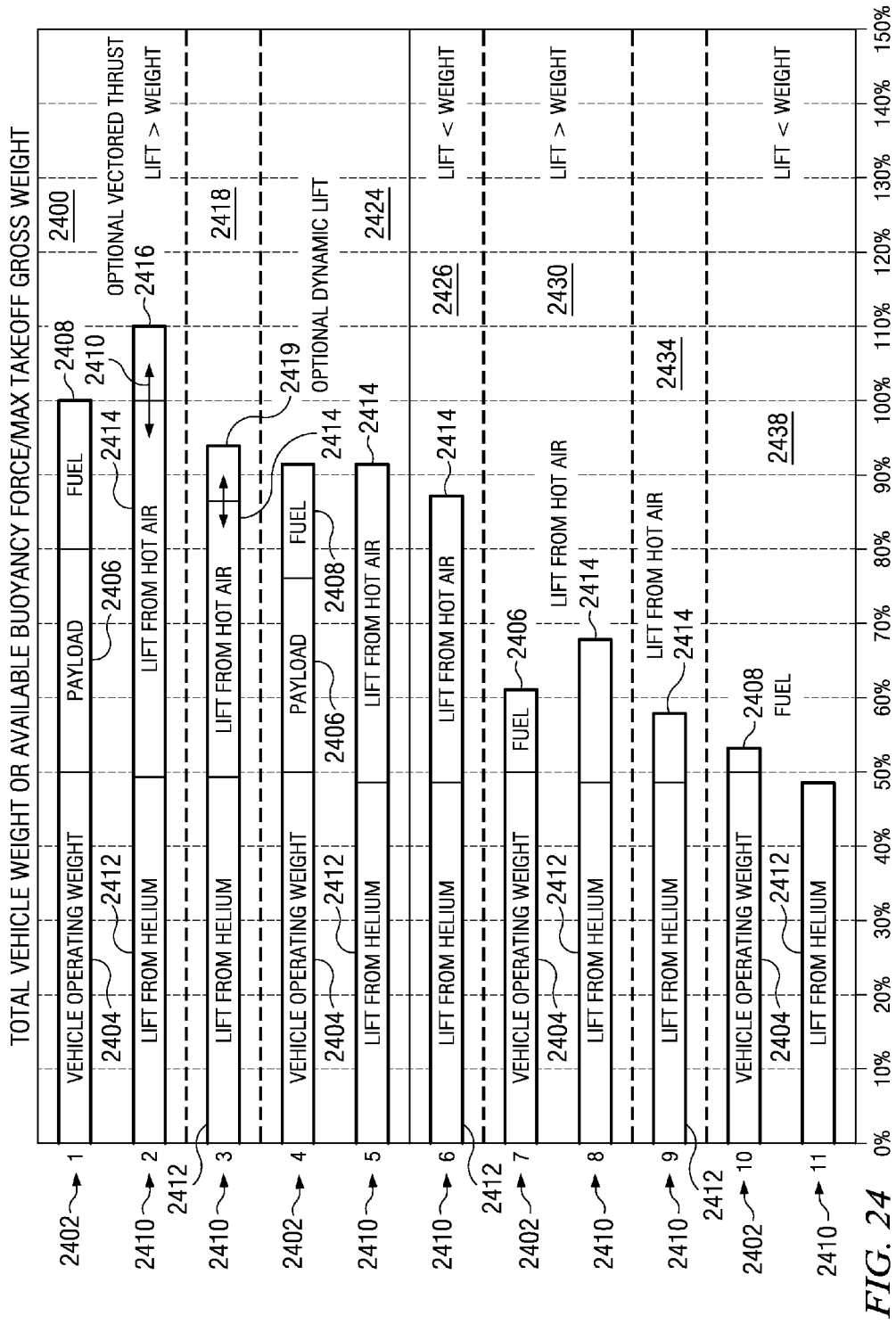
FIG. 24 is a diagram illustrating buoyancy force versus airship weight during different phases of an airship mission in accordance with an advantageous embodiment.

With reference now to FIG. 24, a diagram illustrating buoyancy force versus airship weight during different phases of an airship mission is depicted in accordance with an advantageous embodiment. In this example, the mission may be to transport cargo using an airship, such as airship 200 in FIG. 2. This example shows another manner in an airship can ascend and descend using positive and negative buoyancies to change the lift for an airship. In this example, propulsion from an engine may be used to supplement or provided the needed lift if a positive buoyancy cannot be reached.

Section 2400 illustrates the beginning of an airship mission in which airship weight 2402 includes vehicle operating empty weight 2404, payload 2406, and fuel 2408. In these examples, payload 2406 may be a one million pound payload. In this illustrative example, lift 2410 includes contributions from helium 2412, hot air 2414, and vectored thrust 2416. To provide the needed buoyancy, hot air 2414 may be heated to around 123 degrees Fahrenheit above the ambient air temperature or around 182 Fahrenheit. The heating time for a one million pound payload may be around two hours or less.

In this example, helium 2412 provides a buoyancy force that is around 98 percent of the vehicle operating empty weight. As a result, when the airship is empty, the airship is heavier than air. Hot air 2414 provides the remaining buoyancy force needed to lift the airship. This buoyancy force combined with that provided by helium 2412 may lift the airship from sea level up to around 10,000 feet in altitude.

Vectored thrust 2416 is optional in these examples. Vectored thrust 2416 may be employed to provide additional lift for a quicker takeoff. Vectored thrust 2416 may be generated by an engine thrust directed or vectored downward to provide the additional lift. Further, with vectored thrust 2416, the amount of buoyancy from heated air may be reduced.

With the addition of vectored thrust 2416, the temperature of the hot air 2414 may be reduced along with the time required to heat the air. The airship can rise when the sum of buoyancy and the vertical thrust component are greater than the vehicle weight. If vectored thrust 2416 is not present, hot air 2414 may be increased in temperature to provide lift sufficient to cause the vehicle to ascend from the ground. As a result, buoyancy 2410 is greater than airship weight 2402. The airship may have positive buoyancy, allowing the airship to rise. If vectored thrust 2416 is not present, then hot air 2414 may be increased to provide sufficient buoyancy force to lift the airship upwards off the ground.

In section 2418, hot air 2414 and dynamic lift 2419 in buoyancy 2410 are reduced to provide for a cruising phase or mode for the airship. In this example, dynamic lift 2419 may be achieved from dynamic lift characteristics or features. These features may include, for example, a strake, a fin, a wing, a bi-convex shape for the shell, or some other aerodynamic feature may be used. When cruising, portions of fuel 2408 may be consumed reducing airship weight 2402.

When cruising around 10,000 feet, the temperature of hot air 2414 may be around 212 degrees Fahrenheit to provide sufficient buoyant force for buoyancy 2410 to provide for steady flight. With this type of condition, no dynamic lift is needed and the airship may be trimmed to zero degrees angle of attack.

In section 2424, the aircraft is at the mid point of the mission in which hovering may occur as shown with buoyancy 2410. In section 2426, the airship has buoyancy 2410 adjusted for a landing. In this example, buoyancy 2410 is less than airship weight 2402. Airship weight 2402 has reduced because of the usage of fuel 2408 in the mission. In this example, hovering occurs with buoyancy 2410, in which no vectored thrust is present and lift from hot air 2414 is reduced. This reduction in buoyancy 2410 may occur as a result of reducing temperature of hot air 2414. During a landing phase, buoyancy 2410 is present in which hot air 2414 is reduced even further below airship weight 2402 such that the lift is less than the weight.

In section 2430, the airship is taking off from the delivery point for the cargo. At this time, the cargo has been removed, and airship weight 2402 only includes vehicle operating weight 2404 and fuel 2406. At this point, buoyancy 2410 is greater than airship weight 2402 resulting in a take off of the airship. In section 2434, the airship is traveling on a return trip in which fuel is being consumed, buoyancy 2410 is reduced to allow the airship to land. In section 2438, the airship has returned to its starting point or to another location after delivering the cargo. Buoyancy 2410 only includes lift from helium 2412 with no lifting force from the hot air in this example. As a result, negative buoyancy is present and the aircraft remains on the ground after landing.

An airship, such as airship 200 in FIG. 2, may ascend and/or descend with neutral buoyancy even though different examples describe the ascending and descending based only on the buoyancy of the airship. While a positive buoyancy for ascending and a negative buoyancy for descending may be desirable in some instances, these states are not a limitation as to when an airship may ascend or descend.

For example, an airship with neutral buoyancy can ascend and descend by pointing the airship up or down and use propulsion system thrust to advance along the axis of the airship. This type of movement is an efficient means of ascending and descending because of the low drag of the airship when moving along its axis while neutrally buoyant. This type of movement, however, cannot be applied when the vehicle is in a level attitude close to the ground.

Alternatively, the airship can ascend and descend with the body at a level attitude by directing its propulsion system upwards or downwards. When the airship is neutrally buoyant, the propulsion system provides for acceleration and overcomes the drag of the airship. This method can be used to depart or approach the ground when the angle of the airship must be near level. This method can be augmented or replaced with a variation in buoyancy away from neutral, such as positive when ascending and negative when descending.

Controlling the final stages of a descent to the ground purely with variations in buoyancy is unlikely to be an attractive method because the response of the thermal system may be too slow. This type of response makes fine and rapid adjustments difficult or impossible. The propulsion system, on the other hand, is able to adjust thrust amount and direction very quickly.

In this manner, the different advantageous embodiments provide a hybrid thermal airship that has a capability to adjust buoyancy over a wide range of operating conditions. In the different advantageous embodiments, a neutral buoyancy may be achieved for various weight conditions from very light to maximum weight conditions over a wide range of altitudes. In these examples, the altitude may be from around zero feet to around 10,000 feet.

Further, in the different advantageous embodiments, the airship may be adjusted to a non-neutral buoyancy as desired.

This type of capability may be provided, in these examples, without a severe size penalty as suffered by purely heated airships that are currently used. Further, adjustments to buoyancy may be made more rapidly through the heating and ventilation system.

Also, the different advantageous embodiments allow for independent buoyancy adjustments to be made in different sections of an airship to create pitch or roll moments for trimming purposes.

In the different advantageous embodiments, the hybrid buoyancy system allows the airship to fly at various speeds, such as slow, hover, and at altitudes between minimum altitudes and maximum neutrally buoyant altitudes. Further, this type of capability may be achieved for a number of different types of operation weights of the airship using the hybrid gas system. Additionally, the different advantageous embodiments allow the airship to maneuver while hovering using a vectored thrust from the propulsion system. In these examples, the buoyancy system allows the airship to provide a general touchdown with very light ground pressure through using neutral buoyancy.

In the different advantageous embodiments, the ventilation system allows an airship to land and quickly reduce buoyancy from the heated air to resist wind forces that may otherwise tend to shift the airship. In these illustrative examples, the hot air buoyancy may be reduced by releasing hot air through vents and replacing the hot air with cool outside ambient air.

In the different advantageous embodiments, the cells provide ample volume for the helium portions to expand. As a result, the airship may fly above maximum altitudes at which neutral buoyancy may be maintained. Further, the aerodynamic lift may be used to augment buoyancy as altitude increases beyond the maximum neutral buoyancy altitude.

Further, with the altitudes that may be reached by the airship, the airship may use favorable high altitude winds, such as tail winds, to increase the efficiency speed, and/or range. In these examples, the airship may use heat from different systems to heat the different cells. Further, the heating in the cells also may prevent ice accumulation on the surface and also may evaporate moisture that may accumulate.

In these different advantageous embodiments, a thermal hybrid airship may be designed to carry a payload of around one million pounds. This type payload may be carried from the combination of using helium gas, heated air, aerodynamic lift, and vectored thrust. Further, the airship, in the different advantageous embodiments, may cruise above weather conditions and catch jet streams that may be found as high as around 30,000 feet.

In these examples, the volume within the shell of the airship allows for free expansion of all contained gases within the gas storage system and the air storage system in a manner that allows the airship to operate at an altitude of around 30,000 feet or greater above sea level. At altitudes of around 10,000 feet or less, aerostatic lift from the hot air and helium may supply virtually all of the required lift. As the airship climbs above this altitude or cruises at high altitudes, aerodynamic lift may be used to increase the reachable altitudes. At around 30,000 feet in altitude, the airship may exploit high speed air currents that are common to the jet stream.

In the different advantageous embodiments, the airship may augment buoyancy with aerodynamic lift. The aerodynamic lift may be created with less drag penalty than typically axially symmetric airships. Additionally, in the different advantageous embodiments, the different aerodynamic lift features may result from various components, such as fins, strakes, tails, and other features that may be attached to the shell of an airship.

Further, in the advantageous embodiments, these lift features also may be provided through the use of a bi-convex shape for the airship. This feature may be used in place of or in addition to other aerodynamic lift features. The bi-convex shape provides an ability for an aerodynamic lift feature that does not require the addition or attachment of components, such as strakes, fins, or tails.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An airship comprising:
   a shell encompassing a volume;
   a gas storage system located within the volume, wherein the gas storage system is capable of storing a lighter than air gas;
   an air storage system located within the volume, wherein the air storage system is capable of storing heated air;
   a cargo storage system;
   a heating system heats air to form the heated air; and
   a propulsion system capable of propelling the shell during flight; and
   wherein the heating system heats a front portion of the air storage system differently from a rear portion of the air storage system to change a pitching moment of the airship and a port portion of the air storage system differently from a starboard portion to change a rolling moment of the airship.

2. The airship of claim 1 further comprising:
   a ventilation system passing the air inside the shell to outside of the shell.

3. The airship of claim 1, wherein the gas storage system comprises:
   a plurality of cells located within the volume, wherein each cell in the plurality of cells is sealed and contains the lighter than air gas.

4. The airship of claim 1, wherein the air storage system comprises:
   a set of cells holding the heated air generated by the heating system.

5. The airship of claim 4 further comprising:
   a first vent in a section of the air storage system and a second vent in the section of the air storage system so that a portion of the heated air exits the section and returns to the section after additional heating;
   wherein a buoyancy of the airship is controlled by changing a number of different temperatures in a number of different cells in the set of cells.

6. The airship of claim 2, wherein the ventilation system heats different portions of the air storage system to change at least one of the pitching moment and the rolling moment for the airship.

7. The airship of claim 1, wherein the heating system is selected from at least one of the propulsion system, a heater unit, and a heat exchange system connected to a set of heat generating components in the airship.

8. The airship of claim 1, wherein the shell has at least one of a set of strakes, a set of tails, a set of fins, and a set of wings, and a biconvex shape.

9. The airship of claim 1, wherein the shell has a biconvex shape with a biconvex cross section having an upper arc and a lower arc; and wherein a width to height ration of a cross section of the biconvex shape is defined by a number of portions of a rectangle into which the upper arc and the lower arc are inscribed.

10. The airship of claim 1, wherein the gas storage system provides buoyancy that is around a neutral buoyancy.

11. The airship of claim 1 further comprising:
a gondola connected to the shell.

12. The airship of claim 11, wherein the cargo storage system is located in the gondola.

13. The airship of claim 1, wherein the lighter than air gas is selected from one of helium and hydrogen.

14. The airship of claim 1, wherein the volume allows free expansion of all contained gases within the gas storage system and the air storage system in a manner that allows the airship to operate at an altitude of around 30,000 feet above a sea level.

15. The airship of claim 1, wherein the heated air is stored in an unsealed manner in the air storage system.

16. An apparatus comprising:
a shell encompassing a volume;
a gas storage system located within the volume, wherein the gas storage system stores a lighter than air gas;
an air storage system located within the volume, wherein the air storage system stores heated air;
a set of aerodynamic lift features; and
a propulsion system capable of propelling the shell during flight;
wherein a heating system heats a front portion of the air storage system differently from a rear portion of the air storage system to change a pitching moment of the apparatus and heats a port portion of the air storage system differently from a starboard portion to change a rolling moment of the apparatus.

17. The apparatus of claim 16 further comprising:
a cargo storage system;
a heating system for heating air to form the heated air; and
a ventilation system capable of passing the air inside the shell to outside of the shell.

18. The apparatus of claim 17 further comprising:
a set of cells holding the heated air; and
wherein a buoyancy of the airship is controlled by changing a number of different temperatures in a number of different cells in the set of cells.

19. A method for transporting cargo, the method comprising:
controlling a temperature of stored air located inside an airship to create a variable buoyancy, wherein the airship comprises a shell encompassing a volume; a gas storage system located within the volume, wherein the gas storage system is capable of storing a lighter than air gas; an air storage system located within the volume, wherein the air storage system is capable of storing heated air; a cargo storage system; a heating system for heating air to form the heated air; and a propulsion system capable of propelling the shell during flight;
heating a front portion of the air storage system differently from a rear portion of the air storage system to change a pitching moment of the airship and a port portion of the air storage system differently from a starboard portion to change a rolling moment of the airship;
placing the cargo into the cargo storage system while a negative buoyancy is present;
after the cargo has been placed into the cargo storage system, changing the temperature of the stored air in the gas storage system to create a positive buoyancy; and
providing thrust to the airship to generate movement and dynamic lift for the airship.

20. The method of claim 19 further comprising:
moving the airship from an origination location at which the cargo was placed into the cargo storage system to a destination location;
changing the temperature of the stored air in the air storage system to create the negative buoyancy; and
removing the cargo at the destination location with the negative buoyancy.

21. The method of claim 20, wherein the lighter than air gas is selected from one of helium and hydrogen.

22. A method for controlling an airship, the method comprising:
controlling a temperature of stored air located inside the airship to create a variable buoyancy, wherein the airship comprises a shell encompassing a volume; a gas storage system located within the volume, wherein the gas storage system is capable of storing a lighter than air gas; an air storage system located within the volume, wherein the air storage system is capable of storing heated air; a cargo storage system; and a heating system for heating air to form the heated; and
changing a moment of the airship by the heating and cooling system heating at least a first section of the air storage system to a first temperature and cooling a second section of the air storage system to a second temperature.

23. The method of claim 21, wherein the airship includes a propulsion system capable of propelling the shell during flight and further comprising:
providing thrust to the airship to generate movement and dynamic lift for the airship.

* * * * *